United States Patent
Ibrahim et al.

(10) Patent No.: US 12,184,398 B2
(45) Date of Patent: *Dec. 31, 2024

(54) GROUP COMMON DCI FOR CLI MEASUREMENT AND REPORTING

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,863

(22) Filed: Jul. 10, 2023

(65) Prior Publication Data

US 2023/0353268 A1    Nov. 2, 2023

Related U.S. Application Data

(63) Continuation of application No. 17/115,707, filed on Dec. 8, 2020, now Pat. No. 11,700,073.

(Continued)

(51) Int. Cl.
*H04B 17/309* (2015.01)
*H04J 11/00* (2006.01)
(Continued)

(52) U.S. Cl.
CPC ........ *H04J 11/0053* (2013.01); *H04B 17/309* (2015.01); *H04L 5/0048* (2013.01); *H04W 72/23* (2023.01); *H04W 72/541* (2023.01)

(58) Field of Classification Search
None
See application file for complete search history.

(56) References Cited

U.S. PATENT DOCUMENTS 10,547,426 B2 * 1/2020 Papasakellariou .... H04W 52/58
11,576,129 B2    2/2023 Go et al.
(Continued)

FOREIGN PATENT DOCUMENTS

EP    3567759 A1    11/2019
WO    2020033937 A1    2/2020

OTHER PUBLICATIONS

"3rd Generation Partnership Project; Technical Specification Group Radio Access Network; NR; Physical Layer Procedures for Data (Release 16)", 3GPP Standard, Technical Specification, 3GPP TS 38.214, 3rd Generation Partnership Project, Mobile Competence Centre, 650, Route Des Lucioles, F-06921, Sophia-Antipolis Cedex, France, vol. RAN WG1, No. V16.0.0, Dec. 2019, Jan. 14, 2020, XP051860777, pp. 1-147.

(Continued)

*Primary Examiner* — Duc T Duong
(74) *Attorney, Agent, or Firm* — Paul M. McAdams; Polsinelli LLP

(57) ABSTRACT

This disclosure provides systems, devices, apparatus and methods, including computer programs encoded on storage media, for grouping common DCI for CLI measurement and reporting. In a first aspect, a UE may receive DCI that is common to a group of UEs that includes the UE. The DCI may be configured to trigger at least one of an SRS transmission or a CLI measurement. The UE may transmit the SRS transmission and/or report the CLI measurement based on the DCI that is common to the group of UEs. In a second aspect, a base station may transmit at least one DCI that is common to the group of UEs to trigger the at least one of the SRS transmission or the CLI report for the group of UEs.

(Continued)

The base station may receive the CLI report from at least a subset of UEs in the group of UEs.

29 Claims, 19 Drawing Sheets

Related U.S. Application Data

(60) Provisional application No. 63/050,678, filed on Jul. 10, 2020.

(51) Int. Cl.
*H04L 5/00* (2006.01)
*H04W 72/23* (2023.01)
*H04W 72/232* (2023.01)
*H04W 72/541* (2023.01)

(56) References Cited

U.S. PATENT DOCUMENTS

| | | |
|---|---|---|
| 2017/0264402 A1 | 9/2017 | Papasakellariou |
| 2017/0302419 A1 | 10/2017 | Liu et al. |
| 2018/0323916 A1 | 11/2018 | Yang et al. |
| 2018/0323917 A1 | 11/2018 | Um et al. |
| 2019/0273600 A1 | 9/2019 | Wang et al. |
| 2019/0305837 A1 | 10/2019 | Onggosanusi et al. |
| 2020/0112420 A1 | 4/2020 | Xu et al. |
| 2020/0119895 A1 | 4/2020 | Choi et al. |
| 2020/0169435 A1 | 5/2020 | Kang et al. |
| 2020/0213052 A1 | 7/2020 | Li et al. |
| 2020/0228213 A1 | 7/2020 | Masal et al. |
| 2020/0280987 A1* | 9/2020 | Liu ............. H04L 5/0098 |
| 2020/0336340 A1* | 10/2020 | Qin ............. H04B 7/0617 |
| 2020/0359331 A1 | 11/2020 | Park et al. |
| 2021/0084621 A1 | 3/2021 | Kim et al. |
| 2021/0352606 A1 | 11/2021 | Hosseinian et al. |
| 2022/0014298 A1 | 1/2022 | Ibrahim et al. |
| 2022/0022176 A1 | 1/2022 | Chen et al. |
| 2022/0045884 A1 | 2/2022 | Lin et al. |
| 2022/0159417 A1 | 5/2022 | Zhou et al. |
| 2022/0159662 A1* | 5/2022 | Li ............. H04L 5/0051 |
| 2022/0174528 A1* | 6/2022 | Sedin ............. H04L 5/0048 |
| 2022/0232478 A1 | 7/2022 | Huang et al. |
| 2022/0264475 A1 | 8/2022 | Yi et al. |
| 2023/0164701 A1* | 5/2023 | Fakoorian ......... H04W 52/58 455/522 |
| 2024/0049033 A1* | 2/2024 | Kim ............. H04L 5/005 |

OTHER PUBLICATIONS

International Preliminary Report on Patentability—PCT/US2021/036663, The International Bureau of WIPO—Geneva, Switzerland—Jan. 19, 2023.

International Search Report and Written Opinion—PCT/US2021/036663—ISA/EPO—Oct. 11, 2021.

* cited by examiner

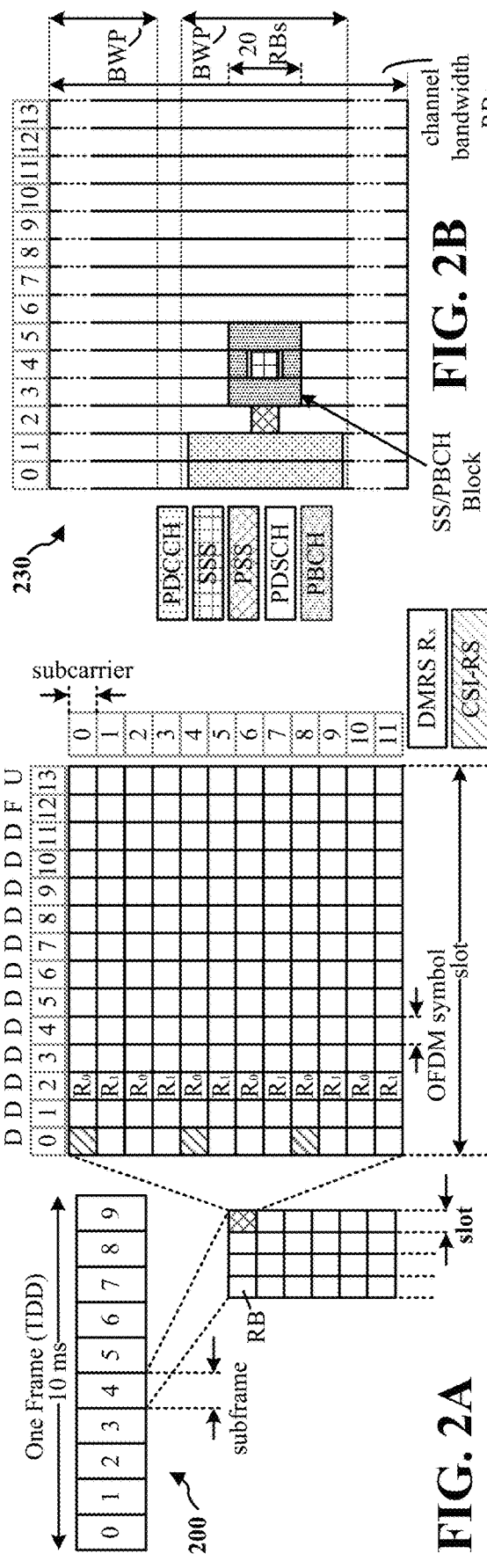
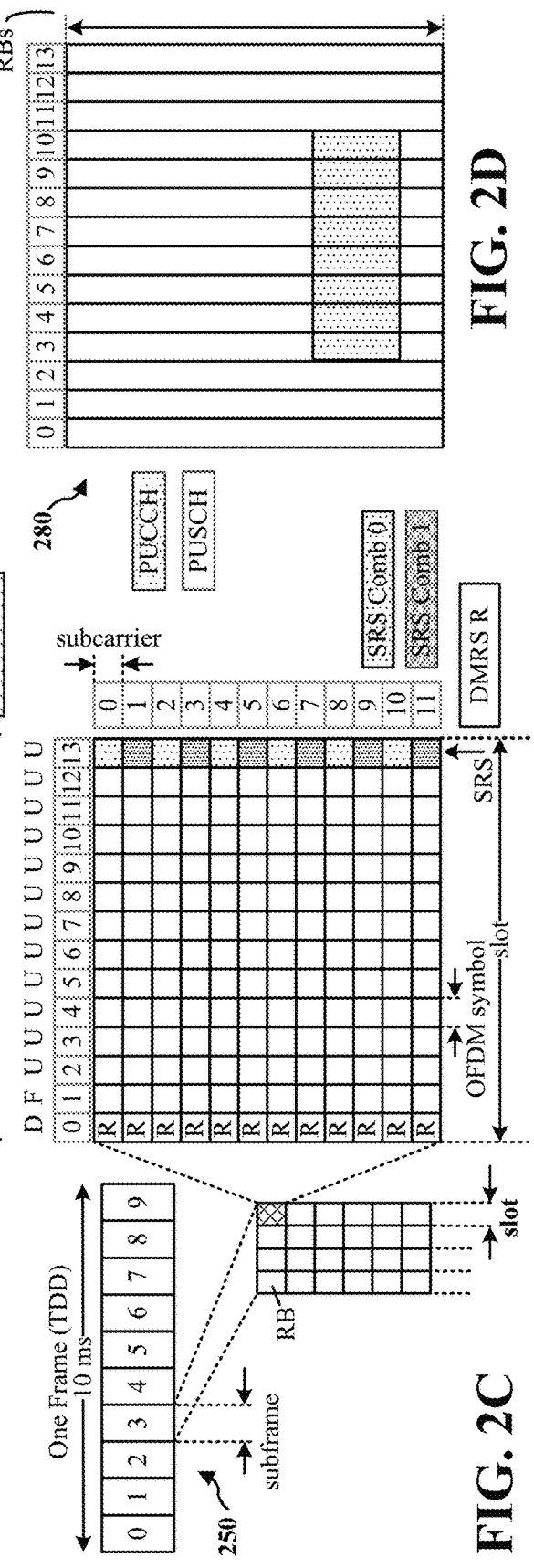

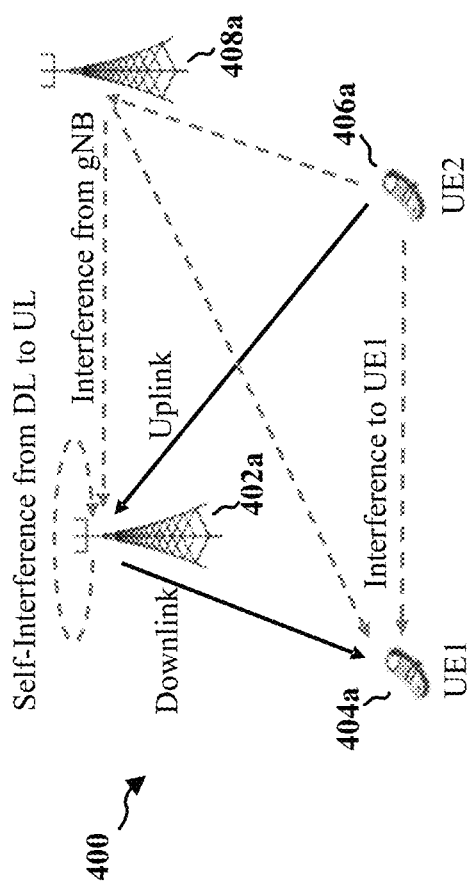
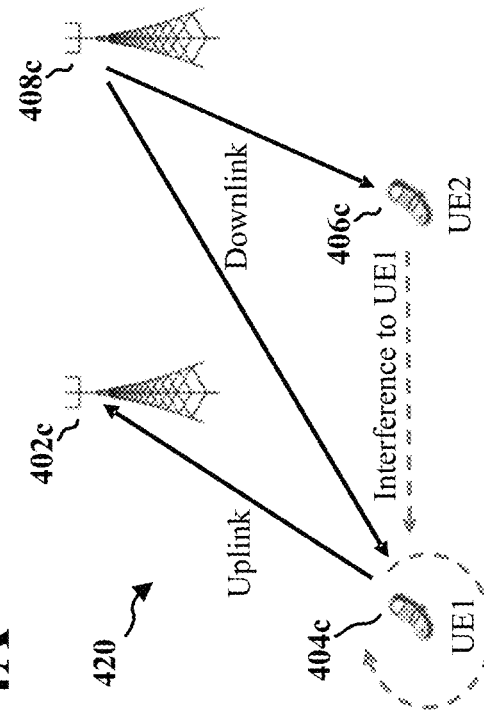
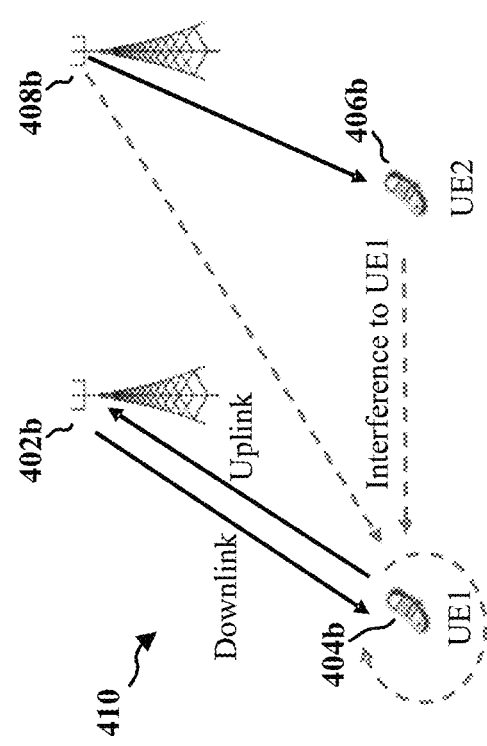
FIG. 4A
FIG. 4C
FIG. 4B

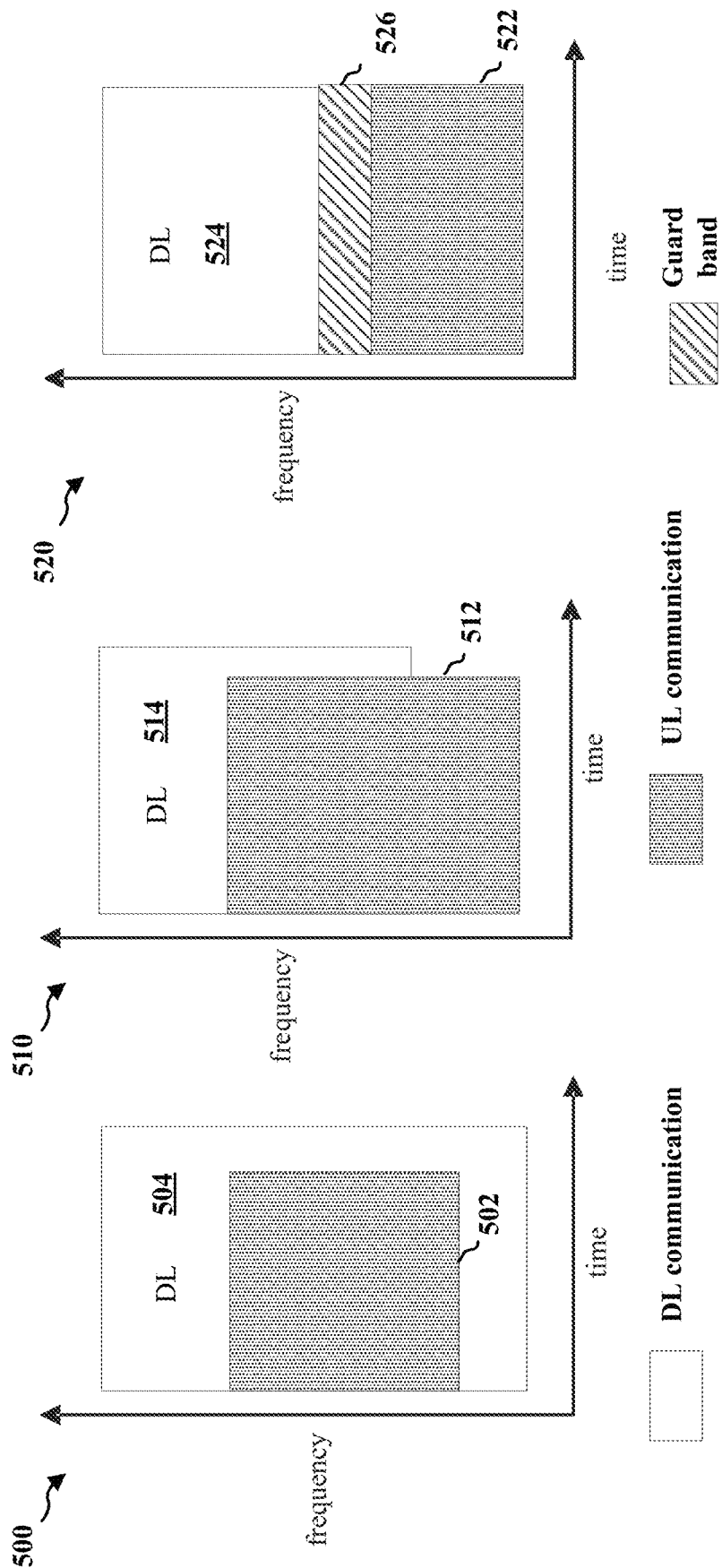

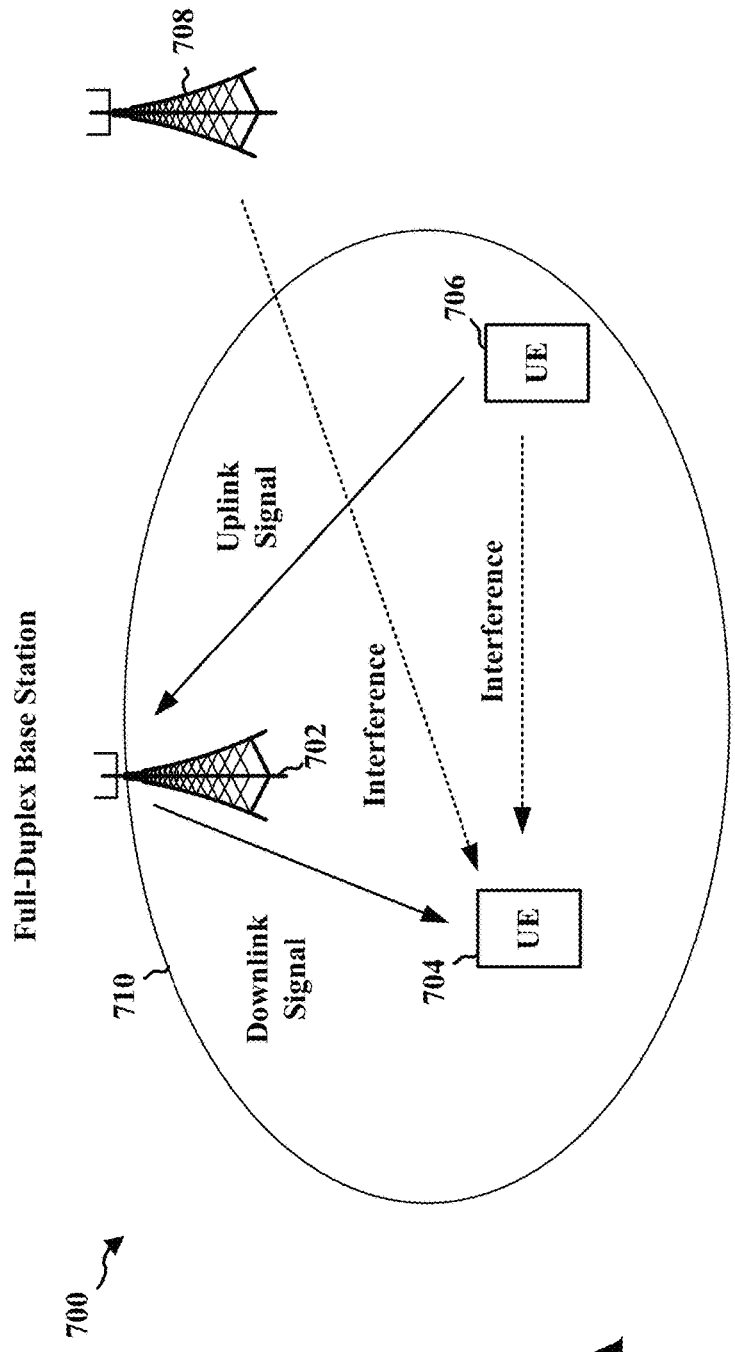
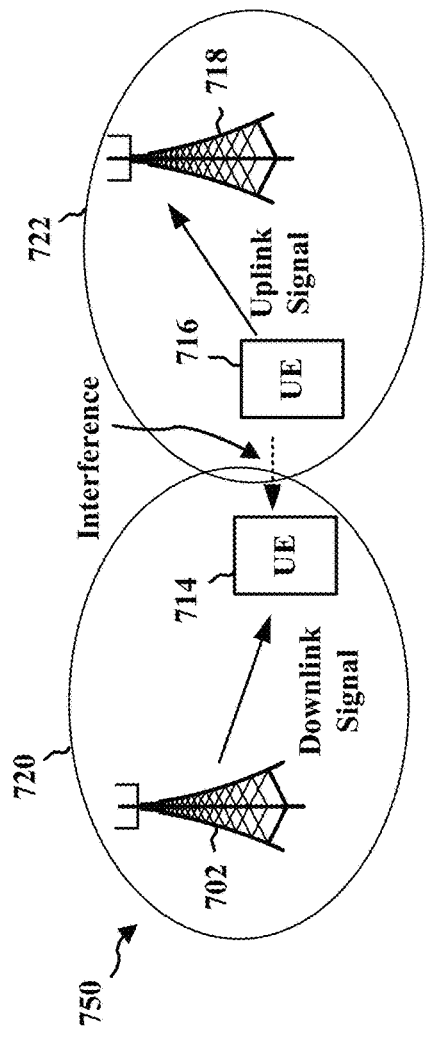
FIG. 7A
FIG. 7B

1500

| Block 0 | Block 1 | ... | Block B |
|---|---|---|---|

↑ DCI Position 1

| Block 0 | Block 1 | ... | Block B1 | Block 0 | Block 1 | ... | Block B2 |
|---|---|---|---|---|---|---|---|

↑ DCI Position 1　　　　　　　　　↑ DCI Position 2

FIG. 15B

GROUP COMMON DCI FOR CLI MEASUREMENT AND REPORTING

CROSS REFERENCE TO RELATED APPLICATION(S)

This application is a Continuation of U.S. Non-provisional application Ser. No. 17/115,707, entitled "GROUP COMMON DCI FOR CLI MEASUREMENT AND REPORTING" and filed Dec. 8, 2020, which claims the benefit of U.S. Provisional Application Ser. No. 63/050,678, entitled "Group Common DCI for CLI Measurement and Reporting" and filed on Jul. 10, 2020, each of which is expressly incorporated by reference herein in its entirety.

BACKGROUND

Technical Field

The present disclosure relates generally to communication systems, and more particularly, to grouping common downlink control information (DCI) for cross-link interference (CLI) measurement and reporting.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device at a UE that includes a memory and at least one processor coupled to the memory. The memory may include instructions that, when executed by the at least one processor, cause the at least one processor to receive DCI that is common to a group of UEs that includes the UE, the DCI configured to trigger at least one of a sounding reference signal (SRS) transmission or a CLI measurement; and transmit the SRS transmission or report the CLI measurement based on the DCI that is common to the group of UEs.

In an aspect of the disclosure, a method, a computer-readable medium, and an apparatus are provided. The apparatus may be a wireless device at a UE that includes a memory and at least one processor coupled to the memory. The memory may include instructions that, when executed by the at least one processor, cause the at least one processor to transmit at least one DCI that is common to a group of UEs to trigger at least one of an SRS transmission or a CLI report for the group of UEs; and receive the CLI report from at least a subset of UEs in the group of UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G NR frame, DL channels within a 5G NR subframe, a second 5G NR frame, and UL channels within a 5G NR subframe, respectively.

FIGS. 4A, 4B, and 4C illustrate exemplary modes of full-duplex communication.

FIGS. 5A and 5B illustrate examples of resources that are in-band full duplex (IBFD).

FIG. 5C illustrates an example of resources for sub-band full-duplex communication.

FIGS. 7A and 7B illustrate examples of intra-cell and inter-cell interference.

FIGS. 15A and 15B illustrate DCI payloads that each have a plurality of blocks.

DETAILED DESCRIPTION

Figure 1:
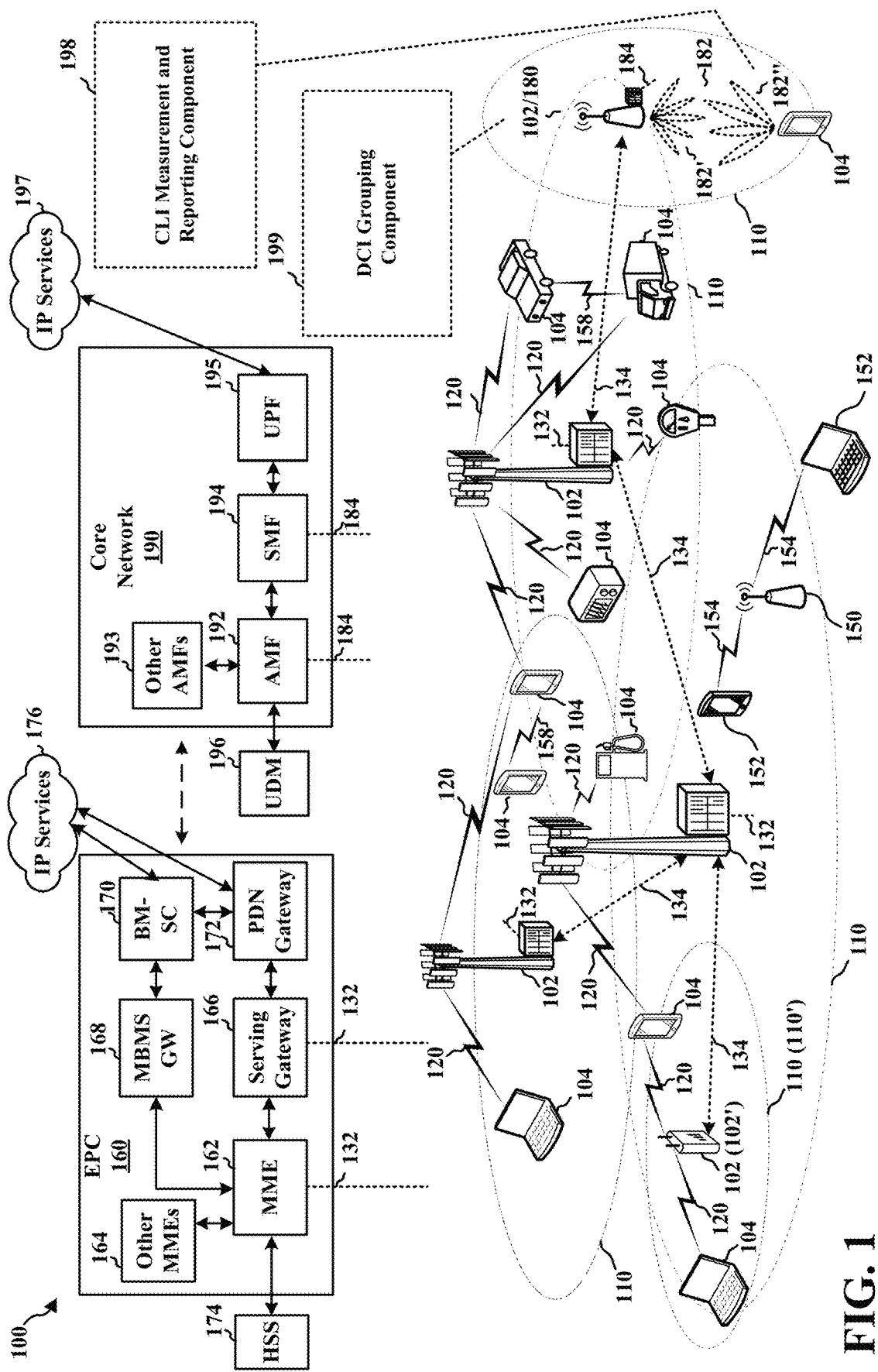
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a cross-link interference (CLI) measurement and reporting component 198 configured to receive downlink control information (DCI) that is common to a group of UEs that includes the UE, the DCI configured to trigger at least one of a sounding reference signal (SRS) transmission or a CLI measurement; and transmit the SRS transmission or report the CLI measurement based on the DCI that is common to the group of UEs. In certain aspects, the base station 180 may include a DCI grouping component 199 configured to transmit at least one DCI that is common to a group of UEs to trigger at least one of an SRS transmission or a CLI report for the group of UEs; and receive the CLI report from at least a subset of UEs in the group of UEs. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI, or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit SRS. The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
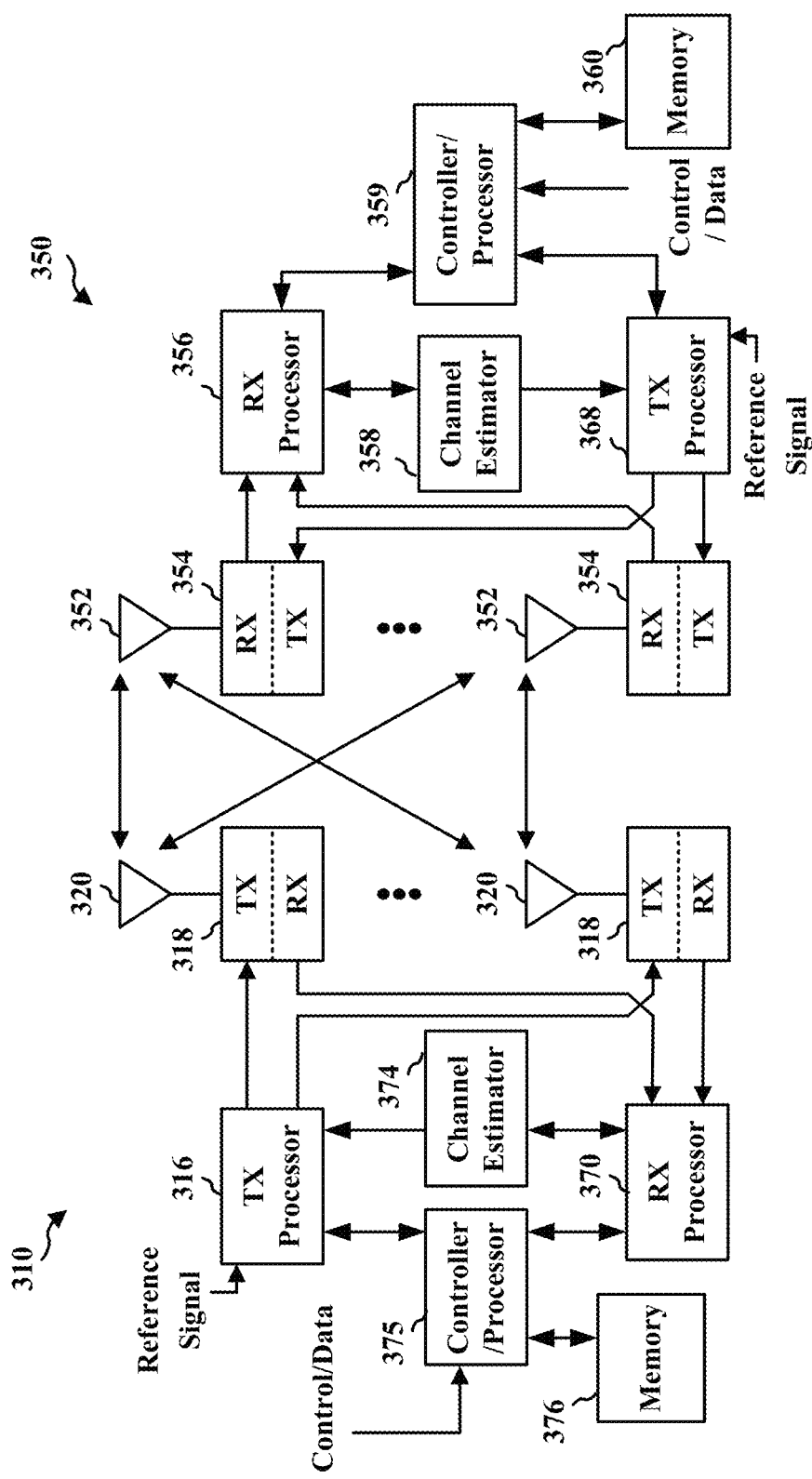
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

FIGS. 4A-4C illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full duplex communication with a first UE 404a and a second UE 406a. Full duplex communication refers to transmission and reception that overlaps in time. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference from the receiving antenna that is receiving the uplink signal from UE 406a while also receiving some of the downlink signal being transmitted to the UE 404a. The base station 402a may experience additional interference due to signals from the second base station 408a. Interference may also occur for reception at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the first base station 402b is a full-duplex base station and the first UE 404b is a full-duplex UE. A full-duplex base station is a base station that transmits and receives signals that overlap in time and within a same frequency range. A full-duplex UE is a UE that transmits and receives signals that overlap in time and within a same frequency range. For example, in FIG. 4B, the first base station 402b and the UE 404b may concurrently receive and transmit communication that overlaps in time in a same frequency band. The base station and the UE may each experience self-interference, in which a device's transmitted signal leaks to (e.g., is received by) a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to (e.g., be received by) the UE's receiver. The first UE 404c may experience additional interference from the second UE 406c.

FIGS. 5A-5B illustrate a first example 500 and a second example 510 of in-band full duplex (IBFD) resources. FIG. 5C illustrates an example 520 of sub-band full-duplex resources. In IBFD, signals may be transmitted and received in overlapping times and overlapping in frequency. As shown in the first example 500, a time and a frequency allocation of a UL resources 502 may fully overlap with a time and a frequency allocation of DL resources 504. In the second example 510, a time and a frequency allocation of UL resources 512 may partially overlap with a time and a frequency of allocation of DL resources 514.

IBFD is in contrast to sub-band FDD, where uplink and downlink resources may overlap in time using different frequencies, as shown in FIG. 5C. As shown in FIG. 5C, the UL resources 522 are separated from the DL resources 524 by a guard band 526. The guard band may be frequency resources, or a gap in frequency resources, provided between the UL resources 522 and the DL resources 524. Separating the UL frequency resources and the DL frequency resources with a guard band may help to reduce self-interference. In some examples, a guard band might not be provided between the separate UL resources and DL resources. For example, UL resources and DL resources that are immediately adjacent may be considered to have a guard band width of 0. As an output signal, e.g., from a UE transmitter, may extend outside the UL resources, the guard band may reduce interference experienced by the UE. Sub-band FDD may also be referred to as "flexible duplex".

Figure 6:
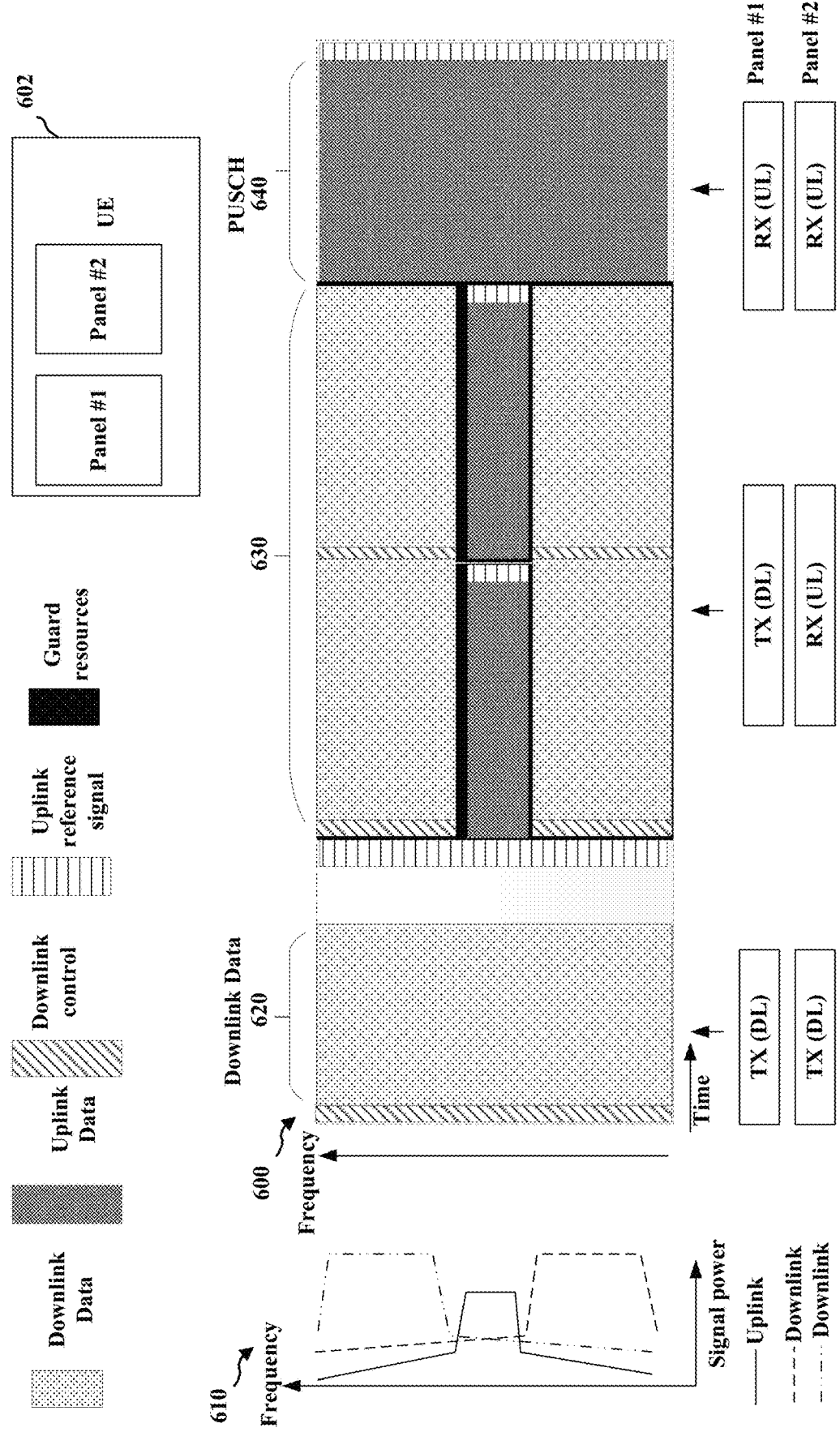
FIG. 6 is an example of time and frequency resources including full-duplex resources.

Aspects presented herein help to provide self-interference mitigation. Aspects may help to improve isolation, such as enabling isolation greater than 50 dB. FIG. 6 illustrates an example device 602 that includes separate panels, e.g., antenna panels, for simultaneous transmission and reception in full-duplex operation. For example, the device 602 is illustrated as including panel #1 and panel #2. In some examples, panel #1 may be for downlink transmission. The downlink transmission may be at both edges of a frequency band, such as illustrated in 600 and 610. Panel #2 may be for uplink reception, such as using frequency resources within a frequency band, such as at a middle of the frequency band. Sub-band full duplex operation, such as described in connection with FIG. 5C may be associated with an isolation of greater than 40 dB. As shown in FIG. 5C, the downlink and uplink resources may be in different portions of a frequency band with a guard band between the uplink and downlink portions of the frequency band. FIG. 6 illustrates an example set of time and frequency resources 600 that include both half duplex and full duplex periods. For example, the period of time 620 includes half duplex resources for downlink data, e.g., panel #1 and panel #2 may both receive downlink data during the period of time 620. The period of time 620 includes sub-band full-duplex resources for uplink transmissions (e.g., PUSCH) and downlink reception (e.g., downlink data), e.g., panel #1 may receive downlink data and panel #2 may transmit PUSCH during the period 630. The period of time 640 includes half duplex resources for uplink data, e.g., panel #1 and panel #2 may both transmit PUSCH during the period of time 640. FIG. 6 also includes a graph 610 showing a signal power over frequency that shows that uplink and downlink signals leak outside of the frequency range provided in the sub-band full-duplex resources of period 630.

A slot format may be referred to as a "D+U" slot when the slot has a frequency band that is used for both uplink and downlink transmissions. The downlink and uplink transmissions may occur in overlapping frequency resources, such as shown in FIGS. 5A and 5B (e.g., in-band full duplex resources) or may occur in adjacent or slightly separated frequency resources, such as shown in FIG. 5C (e.g., sub-band full duplex resources). In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols. For example, in FIG. 6, the period of time 620 may extend for one or more symbols (e.g., downlink only symbols), the period of time 640 may extend for one or more symbols (e.g., uplink only symbols), and the period 630 may extend for one or more symbols (e.g., full-duplex symbols or D+U symbols).

In some examples, the receiver may perform windowed overlap and add (WOLA) to reduce the adjacent channel leakage ratio (ACLR) for the leakage of the uplink signal. An analog low pass filter (LPF) may improve an analog-to-digital conversion (ADC) dynamic range. The receiver automatic gain control (AGC) states may be improved in order to improve the noise figure (NF). Digital interference cancelation of the ACLR leakage, e.g., greater than 20 dB, may be used. In some examples, a non-linear model may be employed for each Tx-Rx pair.

In some examples, uplink power control may be used to mitigate self-interference. For example, a full-duplex UE may reduce the uplink transmission power, which will reduce the interference caused to downlink reception in full-duplex slots through uplink power control. Similarly, a full-duplex base station may reduce the downlink transmission power to reduce the interference caused to uplink reception in full-duplex slots through downlink power control. In some examples, different uplink power control parameters may be applied for a full-duplex slot that are different than for a half-duplex slot. In some examples, sub-band power control parameters, such as uplink power control offset or scaling, may be applied for full-duplex operation and may be different than parameters applied for half-duplex operation.

Aspects presented herein provide for different power control parameters, e.g., uplink power control parameters per sub-band. Uplink power control parameters per sub-band provide more control and increased flexibility for reducing self-interference, while also protecting the uplink transmission.

FIG. 7A illustrates an example communication system 700 with a full-duplex base station 702 that includes intra-cell CLI caused to UE 704 by UE 706 that are located within the same cell coverage 710 as well as inter-cell interference from a base station 708 outside of the cell coverage 710. FIG. 7B illustrates an example communication system 750 showing inter-cell cross-link interference from UE 716 that interferences with downlink reception for UE 714. The UE 714 is in the cell coverage 720 of the base station 712, and the UE 716 is in the cell coverage 722 of the base station

718. Although not shown, an uplink transmission from a full-duplex UE may cause self-interference to the UE's own downlink reception.

Figure 8:
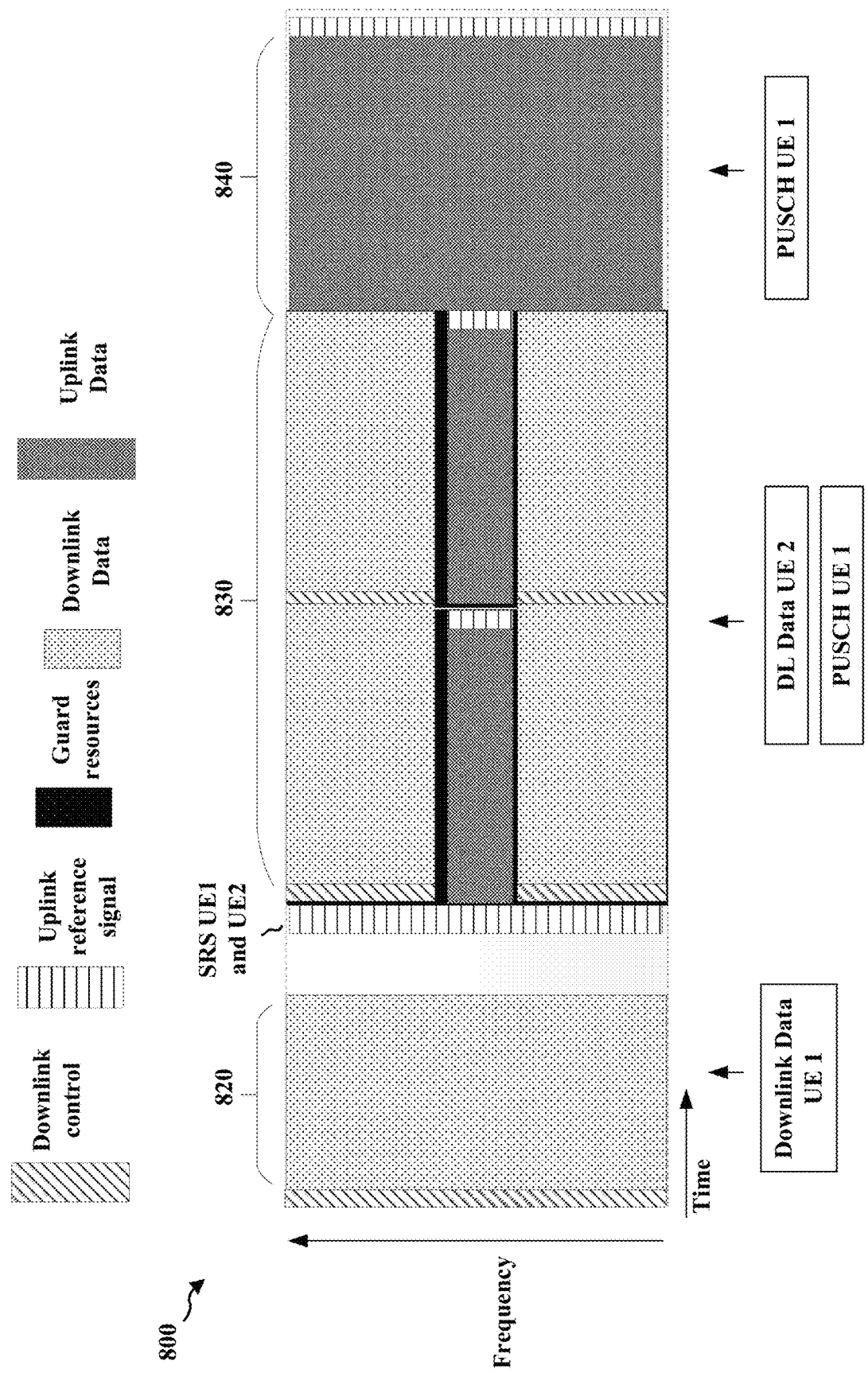
FIG. 8 illustrates an example of resources configured for sub-band full-duplex communication with multiple UEs.

In sub-band full duplex (SBFD), a base station may configure a downlink transmission to a UE in frequency domain resources that are adjacent to frequency domain resources for uplink transmissions for another UE. For example, in FIG. 7A, the frequency resources for the downlink transmission to the UE 704 may be adjacent to the frequency resources for the uplink transmission from the UE 706. FIG. 8 illustrates an example 800 of frequency resources over time that include periods 820 and 840 for half-duplex communication and a period 830 for full-duplex communication. The period 830 may comprise one or more SBFD symbols, or D+U symbols, in which UE1 (e.g., UE 706) transmits uplink communication to the base station (e.g., base station 702) within a frequency band that includes frequency resources for UE2 (e.g., UE 704) to receive downlink transmissions from the base station (e.g., base station 702). The uplink transmission from UE1 may cause interference to the downlink reception of UE 2 during the period 730.

Figure 9:
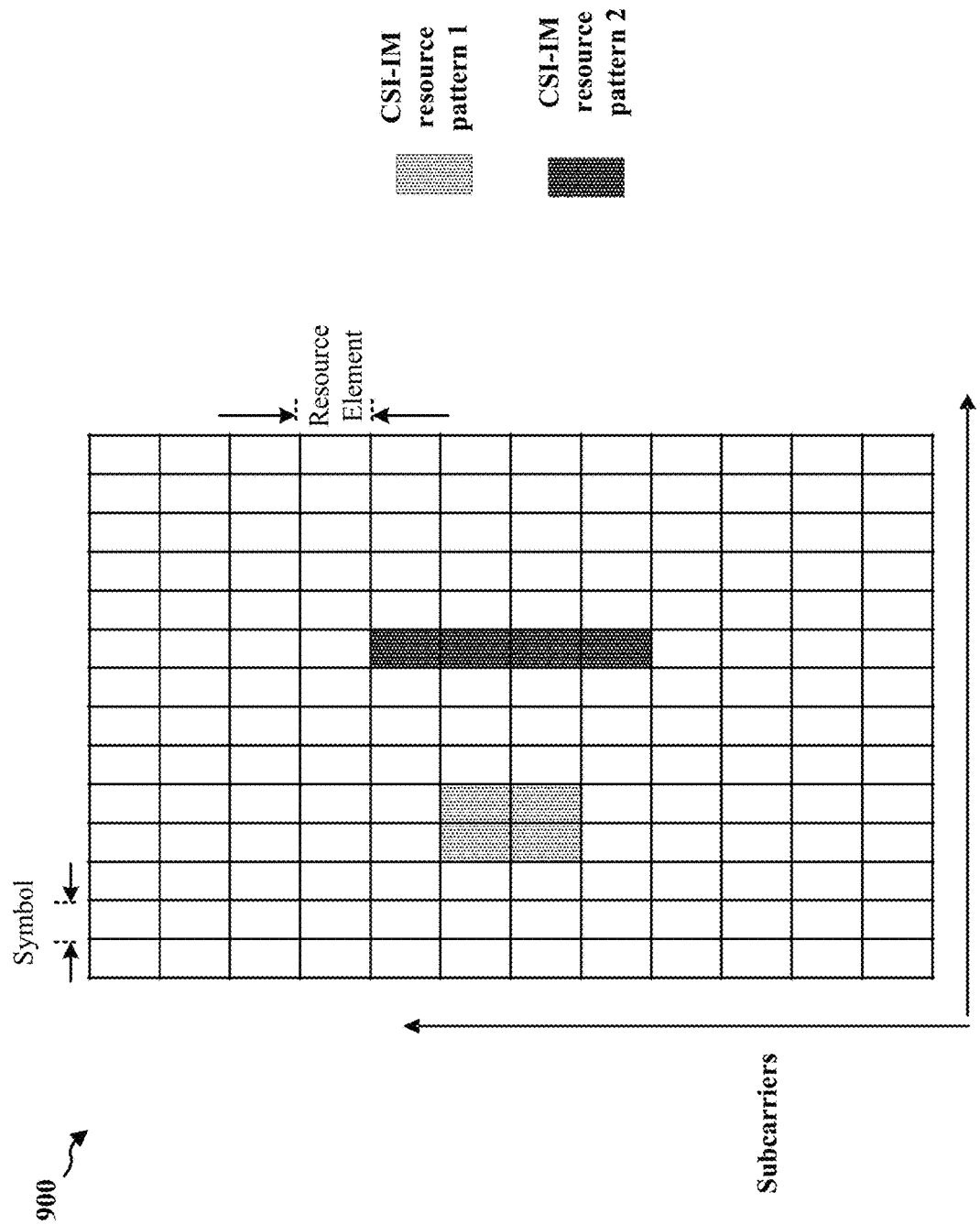
FIG. 9 illustrates an example of channel state information (CSI) interference measure (IM) (CSI-IM) resources.

Channel state information (CSI) interference measurement (IM) (CSI-IM) resources may be configured by a base station for a UE to perform interference measurements to enable accurate CSI reporting that reflects inter-cell interference. FIG. 9 illustrates two example patterns of CSI-IM resources 900. A first pattern, which may be referred to as Pattern 0, includes two contiguous resource elements in two contiguous symbols. The second pattern, which may be referred to as Pattern 1, includes four contiguous resource elements in a single symbol. The size of the CSI-IM resource in frequency may be configured based on a starting resource block and a number of resource blocks. A CSI report configuration may indicate the CSI-IM resource set for the UE to use for interference measurements. The UE may then use the configured CSI-IM resources to measure interference at the UE and to report such interference to the base station that configured the CSI report.

Figure 10:
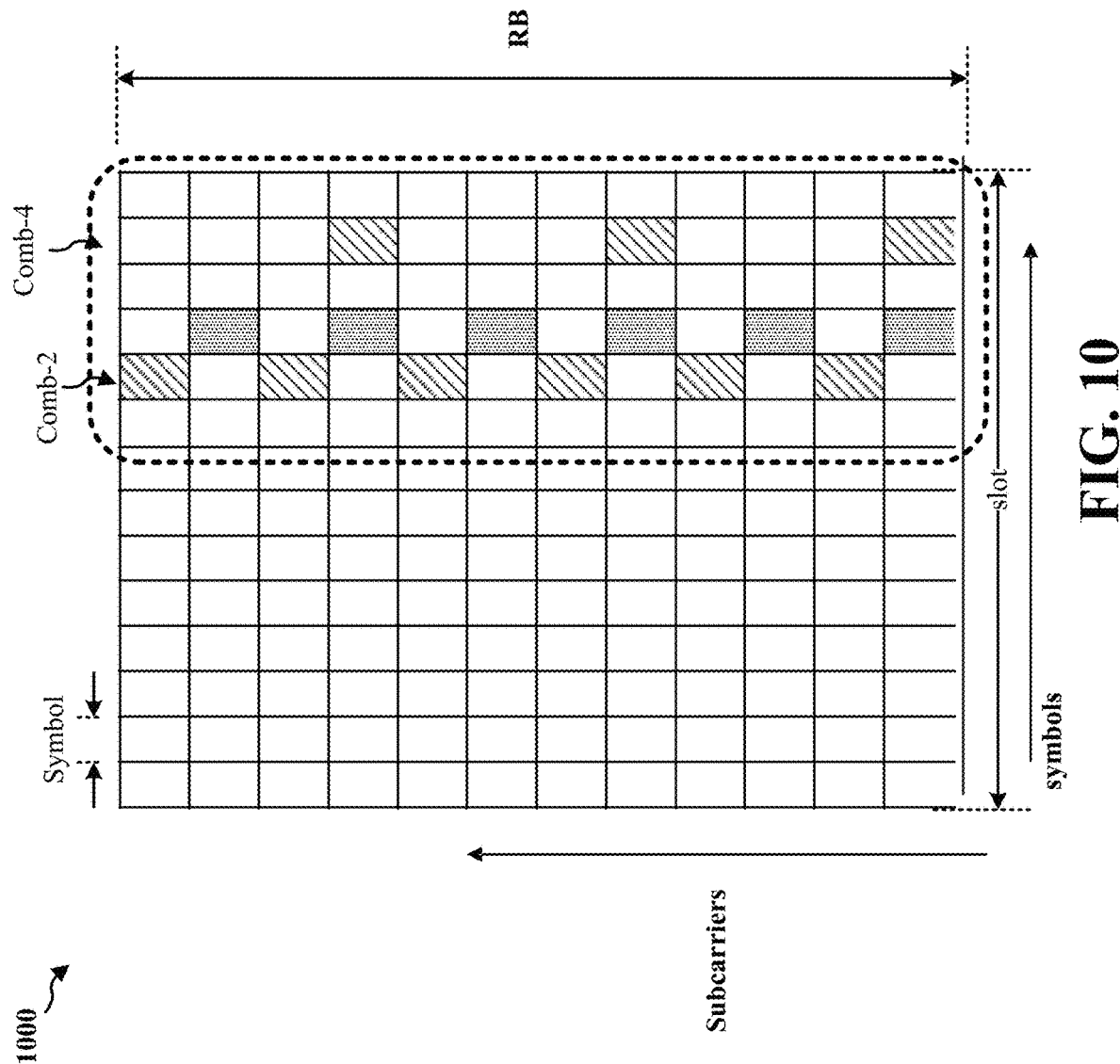
FIG. 10 illustrates an example of sounding reference signal (SRS) resources.

FIG. 10 illustrates examples of SRS resources 1000 for an uplink reference signal transmission by a UE. The SRS may be used by another UE to perform interference measurements. The SRS resources may be mapped to physical resources in a resource block. In time, the SRS resources may span up to four symbols and may be configured in the last six symbols of a slot. In the frequency domain, a comb-2 or a comb-4 SRS can be configured with a comb offset. The SRS resources may be configured in time and frequency. For example, the SRS resources may be periodic, aperiodic, or semi-persistent. The SRS may be configured with a periodicity and a slot offset, for example. The SRS may be configured for a sounding bandwidth within a bandwidth part (BWP). The SRS may be configured with a frequency hopping pattern.

Figure 11:
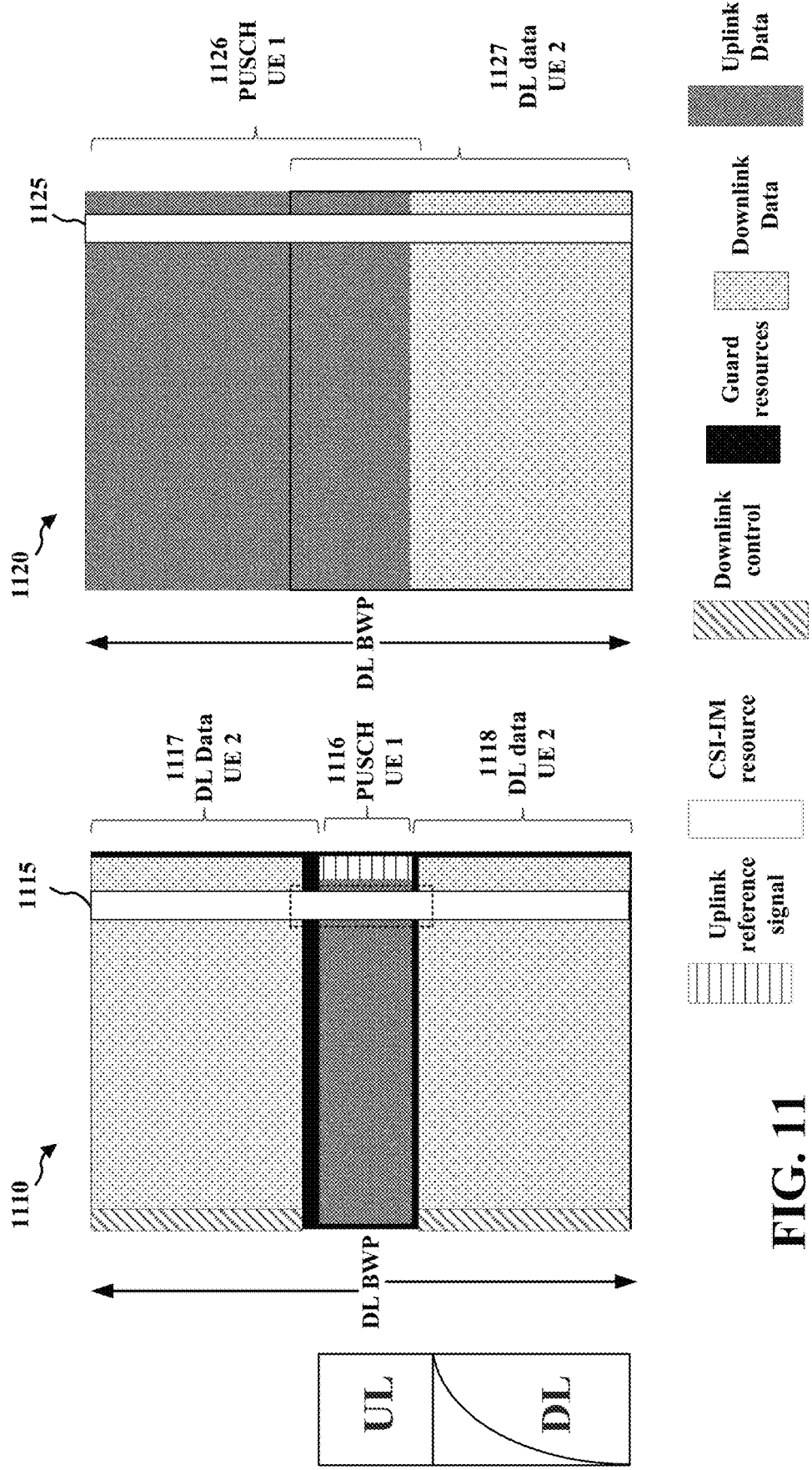
FIG. 11 illustrates examples of cross link interference (CLI) for full-duplex resources.

FIG. 11 illustrates examples of CSI-IM resources relative to full-duplex resources. In the SBFD example 1110, the CSI-IM resources 1115 includes portions 1117 and 1118 that may be subject to inter-cell interference and CLI leakage and portion 1116 that may mainly include CLI interference. The IBFD example 1120 includes CSI-IM resources 1125 having a portion 1126 that is subject to CLI and a portion 1127 that is subject to inter-cell interference and CLI leakage. Intra-cell CLI may limit the performance of some UEs. As described in connection with FIGS. 4A-C and 7A, the CLI may be from uplink transmissions of nearby users in an IBFD mode or due to CLI leakage to downlink reception in an SBFD mode. For full-duplex communication, a base station may configure CSI-IM resources to extend in both the uplink and downlink portions of DL BWP in a full-duplex slot. The CSI-IM resources may enable a full-duplex aware UE or a full-duplex capable UE to measure different components of interference. The UE may measure interference levels in the configured CSI-IM resources, e.g., 1115 or 1125. The UE may calculate the contribution of CLI, e.g., based on a wideband or sub-band received signal strength indication (RSSI). A victim UE may be configured to measure the CLI based on an uplink reference signal of nearby UEs, e.g., such as based on an SRS transmission.

Figure 12:
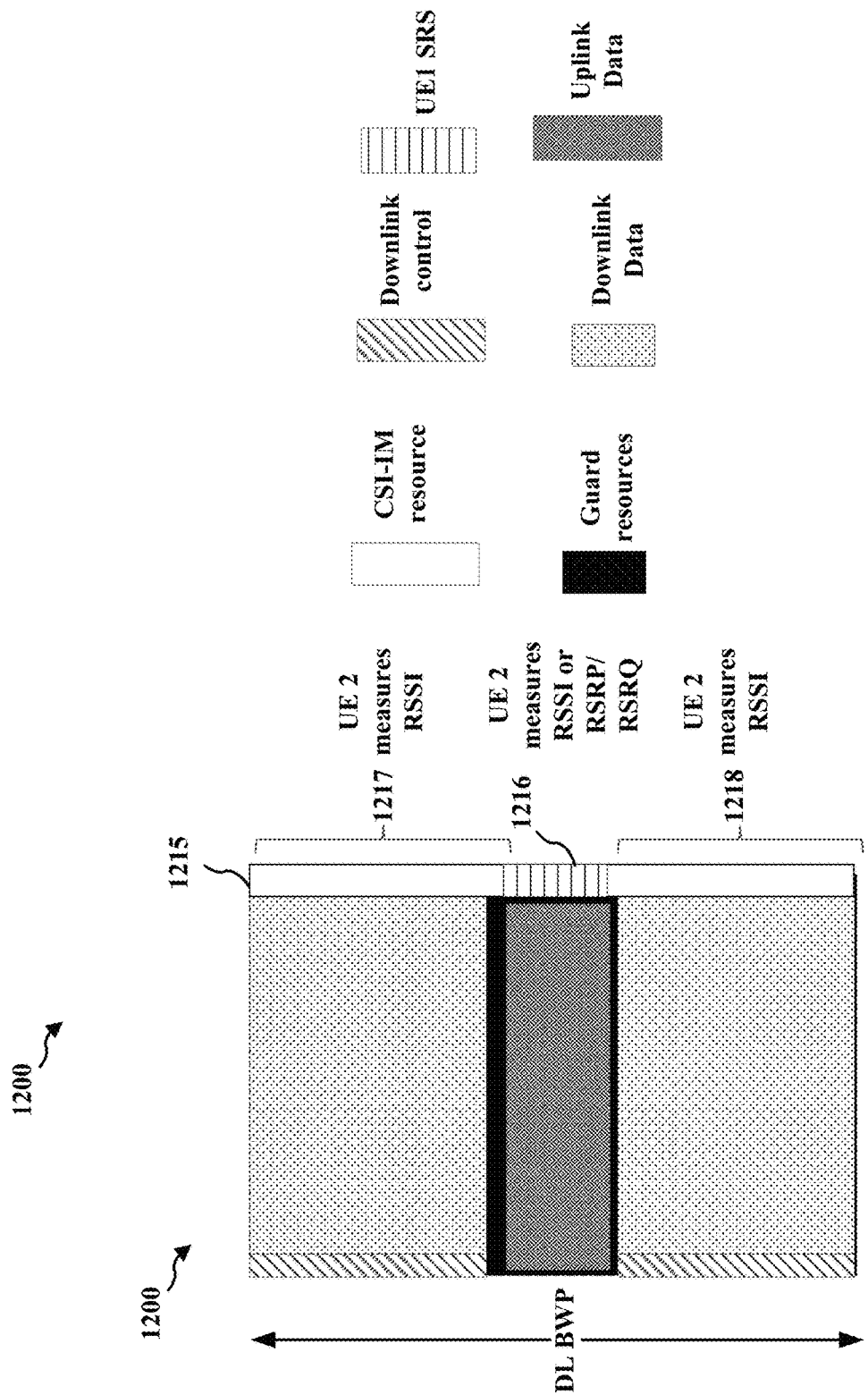
FIG. 12 illustrates an example of CLI from an uplink reference signal of another UE.

FIG. 12 illustrates example resources 1200 in time and frequency that include CSI-IM resources 1215. At portion 1216, UE 1 may be configured to transmit SRS, and UE 2 may be configured to measure CLI from UE1 based on the SRS. The CSI-IM resources in the uplink portion may match the SRS allocation for the UE 1. UE 2, which experienced interference from UE 1 may measure CLI in the configured CSI-IM resources, e.g., based on an RSSI. In some examples, the UE may measure RSSI of CLI leakage in portions 1217 and 1218. The UE may also measure a reference signal received power (RSRP) and/or a reference signal received quality (RSRQ) in the sub-band corresponding to the SRS transmission (e.g., 1216).

Figure 13:
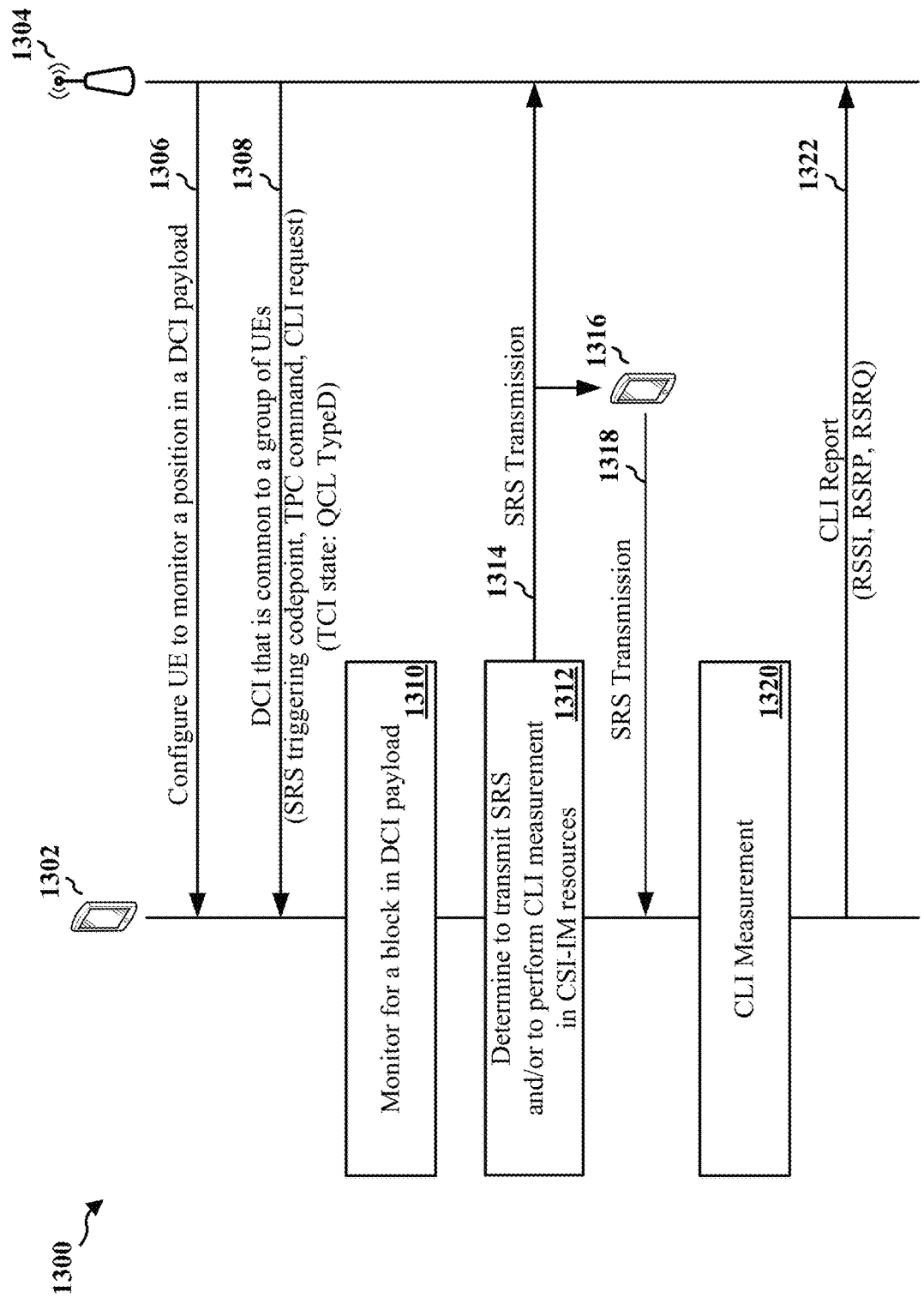
FIG. 13 is a call flow diagram illustrating communications between a UE and a base station.

FIG. 13 is a call flow diagram 1300 illustrating communications between a UE 1302 and a base station 1304. At 1306, the base station 1304 may configure the UE 1302 to monitor a position of a DCI payload. The UE 1302 may be associated with a group of UEs that receive a common DCI from the base station 1304. At 1308, a DCI that is common to the group of UEs may be received by the UE 1302. The DCI may be configured to trigger at least one of an SRS transmission or CLI measurement and reporting. The payload of the DCI may have multiple blocks that include an SRS triggering codepoint, a transmit power control (TPC) command, and/or a CLI request field. The base station 1304 may define a transmission configuration indicator (TCI) state indicative of quasi co-location (QCL)-Type D for CSI-IM resources.

At 1310, the UE 1302 may monitor for a block in the DCI payload. At 1312, the UE may determine based on the identified/monitored block in the DCI payload, to transmit SRS and/or perform a CLI measurement in the CSI-IM resources. At 1314, the UE 1302 may transmit the SRS transmission. The SRS transmission may be received by the base station 1304 or by a second UE 1316 in the group of UEs. At 1318, the UE 1302 may receive an SRS transmission from a subset of UEs (e.g., the second UE 1316) included in the group of UEs. At 1320, the UE 1302 may perform the CLI measurement in the CSI-IM resources. At 1322, the base station 1304 may receive the CLI report from at least a subset of UEs (e.g., the UE 1302) included in the group of UEs. In aspects, the base station 1304 may receive a signal that includes at least one of a received signal strength indicator (RSSI), a reference signal received power (RSRP), or a reference signal received quality (RSRQ). The receive signal may be associated with at least one of the CLI measurement or a self-interference measurement performed based on the SRS transmission at 1314.

Figure 14:
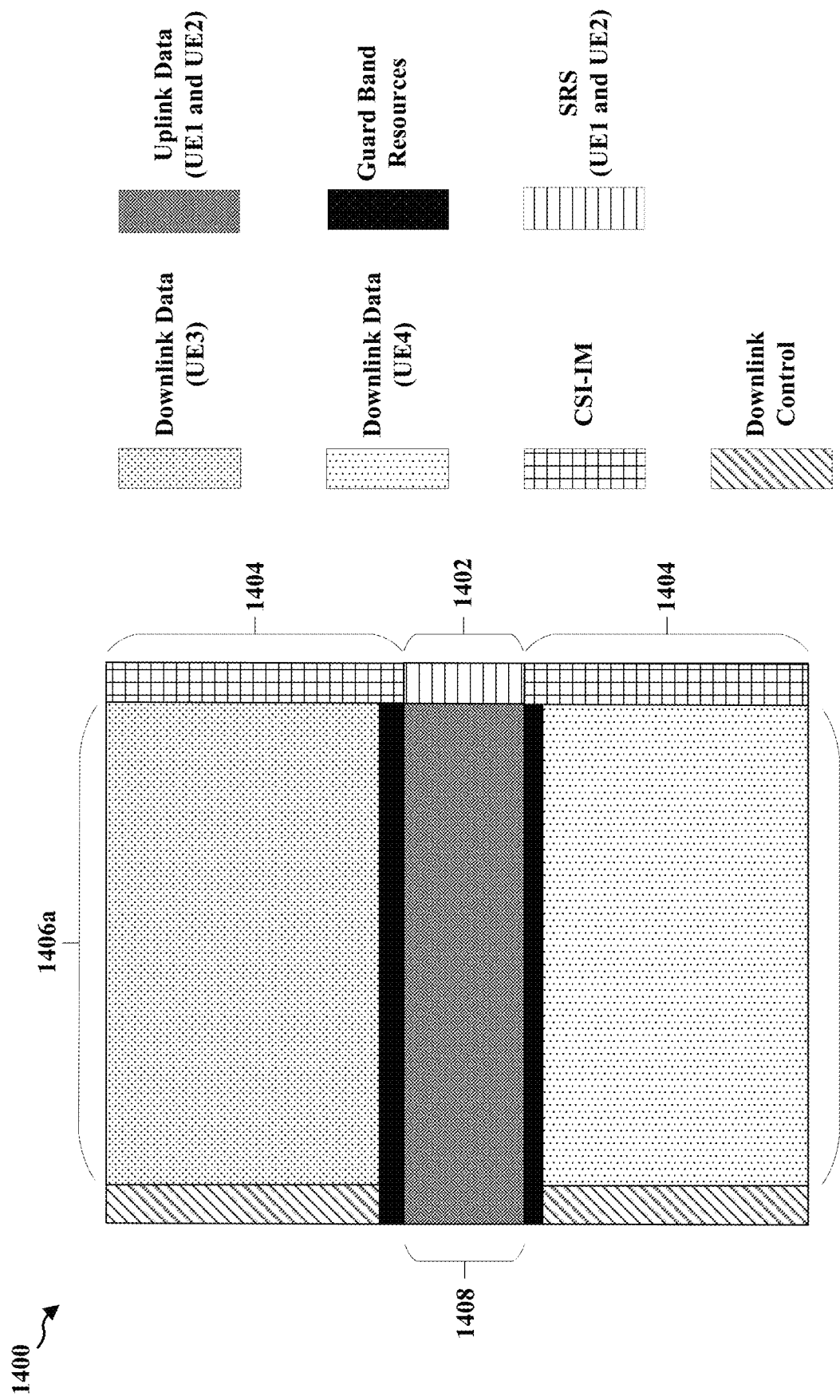
FIG. 14 illustrates an example allocation of time and frequency resources for multiple UEs.

FIG. 14 illustrates an example allocation of time and frequency resources 1400 for multiple UEs. In some aspects, a base station may configure a first UE for an SRS transmission 1402 and a second UE for CLI measurement and reporting via CSI-interference measurement (CSI-IM) resources 1404. In further aspects, the base station may configure one or more UEs to perform multiple measurements at a same time. For example, a "victim" UE may measure CLI from multiple "aggressor" UEs, or an aggressor UE may measure CLI caused to multiple victim UEs. A "victim UE" may be a UE that receives interference from an aggressor UE while the victim UE is attempting to receive a DL data 1406a-b from the base station. An "aggressor UE" may be a UE that is transmitting UL data 1408 to the base station, where the transmitted UL data 1408 interferes with reception of the DL data 1406a-b of the victim UE.

Rather than separately triggering the SRS transmission 1402 and/or the CLI reporting for multiple UEs, common DCI may be grouped together to provide a mechanism for simultaneously triggering one or both of the SRS transmissions 1402 and the CLI measurements. The base station may divide the multiple UEs into two or more sets of UEs that receive the common DCI (e.g., victim UEs and aggressors UEs). A particular UE may be a victim UE and an aggressor UE at a same time when operating in a full-duplex mode. For instance, if the particular UE utilizes the upper band of the time and frequency resources for the DL data 1406a and the particular UE utilizes the middle band for transmission of the UL data 1408, and another UE utilizes the lower band for receiving the DL data 1406b, the UL transmission may not only interfere with the DL reception of the other UE utilizing the lower band but may also cause self-interference/leakage to the DL reception in the upper band.

Common DCI may be grouped based on a first technique to configure multiple/victim UEs for CLI measurement and reporting. In examples, a CSI-IM resource configuration may be provided from the base station to the victim UEs for performing the CLI measurement and reporting. The group of common DCI received from the base station may trigger the CLI reporting by the multiple/victim UEs. A configuration for SRS transmissions 1402 may be similarly provided from the base station to the aggressor UEs based on a second technique for grouping common DCI. In examples, aspects of the first technique and the second technique may be associated with a combined DCI grouping technique to reduce overhead. That is, the base station may configure a single group of common DCI for both triggering SRS transmissions 1402 by the aggressor UEs and triggering CLI measurement and reporting by the victim UEs.

The base station may provide a configuration for a CLI-report associated with CSI-IM resources 1404 and CLI reporting quantities, such as CLI-received signal strength indicator (CLI-RSSI), SRS-reference signal received power (SRS-RSRP), SRS-reference signal received quality (SRS-RSRQ), etc. Additionally, or alternatively, the base station may provide a configuration for the CLI-report based on an SRS transmission 1402 received from an aggressor UE and the CLI reporting quantities, such as CLI-RSSI, SRS-RSRP, SRS-RSRQ, etc.

The base station may configure the aggressor UEs for different SRS resources through the common DCI such that a victim UE may report multiple RSRP/RSSI for the different SRS resources. A transmission configuration indicator (TCI) state for the CSI-IM resources 1404 may be defined by the base station that may be indicative of quasi co-location (QCL)-Type D (e.g., a spatial Rx parameter that the UE may utilize for performing the CLI measurement). In examples, QCL-Type D may be utilized to support beamforming applications. The TCI state may be signaled to the UE similar to transmission techniques for CSI-RS. For aperiodic CLI-reporting, the TCI state may be configured in an aperiodic trigger state. The aperiodic trigger state may include a list of TCI states associated with a CSI-IM resource set that includes multiple CSI-IM resources 1404. That is, if the report is associated with a certain resource set and the resource set includes multiple resources, each TCI state in the list of TCI states may corresponds to particular resources in the resource set.

A full-duplex UE may be included in both sets of UEs (e.g., victim UEs and aggressor UEs) that receive the common DCI from the base station. Accordingly, the full-duplex UE may be configured for both aperiodic SRS transmission and CLI measurement and reporting in CSI-IM resources 1404. Since the UE may transmit and receive at a same time while operating in a full-duplex mode, the time-frequency resources may all be allocated to a UE1. For example, the UE 1 may be simultaneously transmitting UL data 1408 and receiving DL data 1406a-b such that UE1 may be both an aggressor UE and a victim UE. Thus, the common DCI may be configured to trigger both an SRS transmission 1402 and CLI measurement and reporting by UE1 at the same time.

In an example, UE1 and UE2 may be the aggressor UEs and UE3 and UE4 may be the victim UEs. That is, UE1 and UE2 may transmit the UL data 1408 over the middle band and UE3 and UE4 may receive the DL data 1406a-b over the upper band and the lower band, respectively. The base station may transmit the common DCI to trigger SRS transmissions 1402 from UE1 and UE2 and trigger CLI measurement and reporting by UE3 and UE4 in CSI-IM resource 1404. The SRS transmissions 1402 may correspond to a right side of the middle band and the CSI-IM resources 1404 for measuring and reporting CLI leakage may correspond to a right side of the upper/lower bands. The measurements may be reported to the based station via CLI RSRP/RSSI.

FIG. 15A-15B illustrates DCI payloads 1500-1550 that each have a plurality of blocks. A UE may be configured to monitor for a particular block in the plurality of blocks based on a DCI position index, which may be RRC configured. The DCI payload 1500 may indicate an operation that the UE is to perform. For example, if the UE is configured with a first DCI position that corresponds to a block 1, the UE may determine information included in the block 1 and perform a corresponding operation. The DCI payload 1500 may be divided into multiple blocks such that individual UEs may be configured with a respective DCI position corresponding to one of the multiple blocks. In aspects, a same DCI position may be associated with multiple UEs. Each block may include an SRS triggering codepoint (e.g., of 2 bits), which may be indicative of an SRS transmission configuration, an optional transmit power control (TPC) command (e.g., of 2 bits), and a CLI request field for a payload of the block. The SRS triggering codepoint and the TPC command may be for aggressor UEs and the CLI request field may be for victim UEs.

If the UE is a victim UE rather than an aggressor UE, the SRS triggering and the TPC command field may be zero and the UE may monitor for the CLI request field without monitoring for the SRS triggering codepoint or the TPC command. If the UE is an aggressor UE rather than a victim UE, the CLI request field may be zero and the UE may monitor for the SRS triggering codepoint and TPC command without monitoring for the CLI request field. If the UE is both a victim UE and an aggressor UE, the UE may monitor for all three fields, e.g., the SRS triggering codepoint, the TPC command, and the CLI request field.

The CLI request field may be used by the UE to determine which CSI-IM resources the UE may use for CLI measurements. That is, the CLI request field may indicate a CSI-IM resource set for performing the CLI measurements. In a first example, a same SRS codepoint may be used for indicating the CSI-IM when the CSI-IM matches the SRS allocation (e.g., the same SRS triggering codepoint may be used for triggering the CSI-IM). In a second example, the CLI request field may indicate a trigger state associated with the CSI-IM resource set. CSI reports and CLI reports may both use a CSI aperiodic trigger state list, (e.g., a CSI-AperiodicTriggerStateList) that, for example, includes a field size of {0, . . . , 6} bits. The field size may be RRC configured. The CSI-AperiodicTriggerStateList may indicate trigger states to be reported by the UE. A size of the list may be determined based on a number of bits in the CLI request field (e.g., 0 to 6 bits). For instance, 6 bits may correspond to a list that includes $2^6$ trigger states. Since the CLI request field may be used for CLI reporting, both the CSI and the CLI may share the same state list (e.g., which may be referred to as a "StateList"). In this manner, a CSI framework may be used for CLI reporting. In a third example, the CLI request field may define a separate CLI-AperiodicTriggerStateList for CLI reporting. The field size of the separate list may be {0, . . . , 4} bits and may be RRC configured. A trigger state for the separate list may include multiple CLI report IDs. Each CLI report ID may point to a CLI report setting that may be associated with a CSI-IM resource set and QCL-information.

In configurations, the DCI payload 1550 may have two portions. A first portion of the payload 1550 may be indexed based on the first DCI position and a second portion of the payload 1550 may be indexed based on the second DCI position. A UE may be configured with one or more DCI positions. For example, an aggressor UE may be configured with the first DCI position (e.g., without being configured with the second DCI position), a victim UE may be configured with the second DCI position (e.g., without being configured with the first DCI position), and a UE that is both an aggressor UE and a victim UE may be configured with both the first DCI position and the second DCI position. Accordingly, the first portion of the payload 1550 (e.g., B1 blocks) may include information associated with aggressor UEs, such as SRS triggering and TPC commands. The second portion of the payload 1550 (e.g., B2 blocks) may include the indication information for a CSI-IM resource set used for CLI measurement. If two or more UEs have a same configuration, the base station may configure the two or more UEs with a same DCI position.

Figure 16:
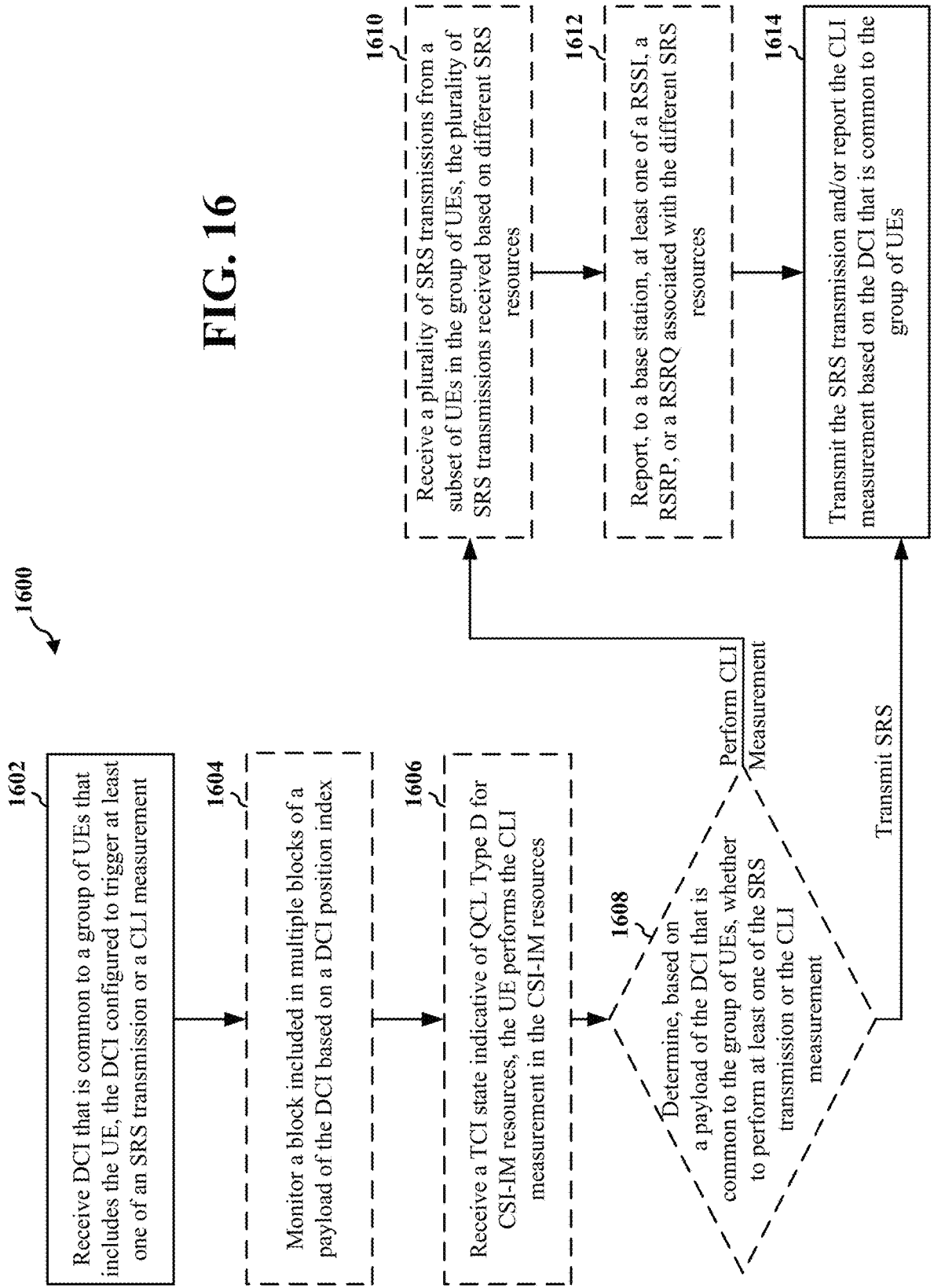
FIG. 16 is a flowchart of a method of CLI measurement and reporting at a UE.

FIG. 16 is a flowchart 1600 of a method of CLI measurement and reporting at a UE. The method may be performed by a UE (e.g., the UE 1302), which may include the memory 360 and which may be the entire UE 1302 or a component of the UE 1302, such as the TX processor 368, the RX processor 356, and/or the controller/processor 359. Optional aspects are illustrated with a dashed line.

At 1602, the UE may receive DCI that is common to a group of UEs that includes the UE, the DCI configured to trigger at least one of an SRS transmission or a CLI measurement. For example, referring to FIG. 13, the UE 1302 may receive, at 1308, DCI that is common to a group of UEs. The received DCI, at 1308, may trigger, at 1314, the SRS transmission and/or trigger, at 1320, the CLI measurement. In examples, the SRS transmission may be aperiodic. The reception may be performed, e.g., by the DCI component 1846 via the reception component 1830 of the apparatus 1802 in FIG. 18.

At 1604, the UE may monitor a block included in the multiple blocks based on the DCI position index. The monitoring may be performed, e.g., by the monitor component 1842 of the apparatus 1802 in FIG. 18. For example, referring to FIGS. 13, 15A, and 15B, the UE 1302 may monitor, at 1310, for a block in the DCI payload 1500-1550 based on a DCI position associated with a DCI position index. The DCI that is common to the group of UEs (e.g., received at 1308) may include a payload (e.g., payloads 1500-1550) having multiple blocks. The multiple blocks may be associated with the DCI position index based on an RRC configuration. The multiple blocks may include a first block (e.g., block B1) and a second block (e.g., block B2). The first block (e.g., block B1) may be configured to trigger the SRS transmission (e.g., at 1314) the second block (e.g., block B2) may be configured to trigger the reporting (e.g., at 1322) of the CLI measurement (e.g., performed at 1320). The UE 1302 may be configured with one or more DCI positions based on the DCI position index. The one or more DCI positions may correspond to a respective block in the multiple blocks of the payload(s) 1500-1550.

At 1606, the UE may receive a TCI state indicative of QCL Type D for CSI-IM resources, where the UE may perform the CLI measurement in the CSI-IM resources. The reception of the TCI state may be performed, e.g., by the TCI state component 1848 via the reception component 1830 of the apparatus 1802. For example, referring to FIGS. 13-14, the TCI state indicative of the QCL Type D may be received at 1308 and the CLI measurement 1320 may be performed in the CSI-IM resources 1404.

At 1608, the UE may determine, based on a payload of the DCI that is common to the group of UEs, whether to perform at least one of the SRS transmission or the CLI measurement. The determination may be performed, e.g., by the determination component 1840 of the apparatus 1802 in FIG. 18. For example, referring to FIGS. 13, 15A, and 15B, the UE 1302 may determine, at 1312, to transmit the SRS transmission at 1314 and/or perform the CLI measurement at 1320 based on a common DCI payload (e.g., payloads 1500-1550). In aspects, determining (e.g., at 1312) whether to perform at least one of the SRS transmission (e.g., at 1314) or the CLI measurement (e.g., at 1320) includes determining that the UE 1302 is a full-duplex UE configured to both transmit the SRS transmission (e.g., at 1314) and perform the CLI measurement (e.g., at 1320) at a same symbol or different symbols of a slot.

If, at 1608, the UE determines to perform the SRS transmission, the UE may transmit the SRS based on the DCI that is common to the group of UEs. The SRS transmission may be performed, e.g., by the SRS component 1850 via the transmission component 1834 of the apparatus 1802 in FIG. 18. Otherwise, if the UE determines, at 1608, to perform CLI measurement, the UE may receive, at 1610, a plurality of SRS transmissions from a subset of UEs in the group of UEs, the plurality of SRS transmissions received based on different SRS resources. The reception of the SRS may be performed, e.g., by the measurement component 1852 of the apparatus 1802 in FIG. 18. For example, referring to FIG. 13, the UE 1302 may receive an SRS transmission at 1318 from a second UE 1316 in the group of UEs.

At 1612, the UE may report, to a base station, at least one of a RSSI, a RSRP, or a RSRQ associated with the different SRS resources. The report may be performed, e.g., by the report component 1844 of the apparatus 1802, e.g., via the transmission component 1834. For example, referring to FIGS. 13 and 14, the UE 1302 may report at least one of RSSI, RSRP, or RSRQ to the base station 1304, which may be associated with the SRS resources (e.g., 1402).

At 1614, the UE may transmit the SRS transmission or reporting the CLI measurement based on the DCI that is common to the group of UEs. The transmission may be performed, e.g., by the transmission component 1834 of the apparatus 1802 in FIG. 18. For example, referring to FIG. 13, the UE 1302 may transmit the SRS transmission at 1314 or report, at 1322, the CLI measurement performed at 1320 based on the DCI received at 1306 that is common to the group of UEs. In examples, a configuration for reporting the CLI measurement to the base station 1304 may be based on a scheduling of an SRS transmission. The CLI measurement (e.g., 1320) may be reported, at 1322, to the base station 1304 based on at least one of a CLI-RSSI, an SRS-RSRP, or an SRS-RSRQ.

Figure 17:
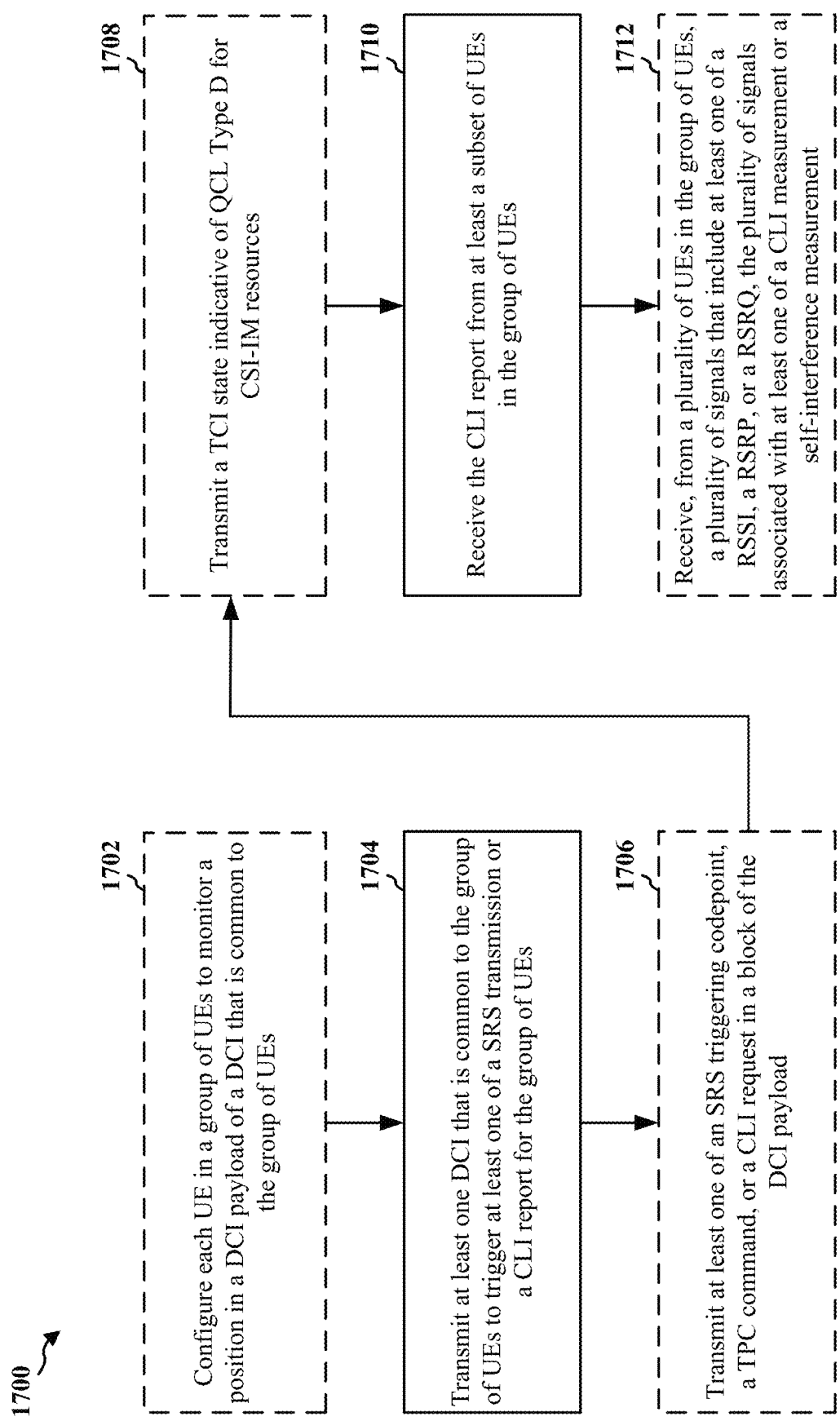
FIG. 17 is a flowchart of a method of CLI measurement and reporting at a base station.

FIG. 17 is a flowchart 1700 of a method of CLI measurement and reporting at a base station. The method may be performed by a base station (e.g., the base station 1304), which may include the memory 376 and which may be the entire base station 1304 or a component of the base station 1304, such as the TX processor 316, the RX processor 370, and/or the controller/processor 375. Optional aspects are illustrated with a dashed line.

At 1702, the base station may configure each UE in the group of UEs to monitor a position in a DCI payload of the DCI that is common to the group of UEs. For example, referring to FIGS. 13, 15A, and 15B, at 1306 the base station 1304 may configure the UE 1302 to monitor a position in a DCI payload, such as a DCI position in the DCI payloads 1500-1550. In examples, each UE in the group of UEs may be configured with one or more DCI positions (e.g., DCI Position 1 and/or DCI Position 2) in the DCI payload (e.g., payloads 1500-1550) that correspond to at least one of transmitting the SRS transmission (e.g., at 1314) or receiving the CLI report (e.g., at 1322). The configuration may be performed, e.g., by the configuration component 1940 of the apparatus 1902 in FIG. 19.

At 1704, the base station may transmit at least one DCI that is common to a group of UEs to trigger at least one of an SRS transmission or a CLI report for the group of UEs. The transmission may be performed, e.g., by the DCI component 1942 via the transmission component 1934 of the apparatus 1902 in FIG. 19. For example, referring to FIG. 13, the base station 1304 may transmit, at 1308, DCI that is common to a group of UEs, where the DCI may trigger the SRS transmission at 1314 and/or the CLI report at 1322. In configurations, the base station 1304 may transmit a first DCI that is common to a first set of UEs to trigger the SRS transmission from the first set of UEs and the base station 1304 may transmit a second DCI that is common to a second set of UEs to trigger the CLI report from the second set of UEs. In further configurations, the base station 1304 may transmit a single DCI (e.g., the DCI transmitted at 1308) that triggers both the SRS transmission (e.g., at 1314) and the CLI report (e.g., at 1322).

At 1706, the base station may transmit at least one of an SRS triggering codepoint, a TPC command, or a CLI request in a block of the DCI payload. The transmission may be performed, e.g., by the DCI component 1942 via the transmission component 1934 of the apparatus 1902 in FIG. 19. For example, referring to FIGS. 13, 15A, and 15B, the base station 1304 may transmit, at 1308, at least one of the SRS triggering codepoint, the TPC command, or the CLI request. The DCI payload (e.g., payloads 1500-1550) may include a first block (e.g., block B1) and a second block (e.g., block B2). The first block (e.g., block B1) may be configured to trigger the SRS transmission (e.g., at 1314) and the second block (e.g., block B2) may be configured to trigger the CLI report (e.g., at 1322) for the group of UEs.

At 1708, the base station may transmit a TCI state indicative of QCL Type D for CSI-IM resources. The transmission may be performed, e.g., by the TCI component 1944 via the transmission component 1934 of the apparatus 1902 in FIG. 19. For example, referring to FIGS. 13-14, the TCI state indicative of the QCL Type D may be transmitted at 1308 for performing the CLI measurement 1320 in the CSI-IM resources 1404.

At 1710, the base station may receive the CLI report from at least a subset of UEs in the group of UEs. For example, referring to FIG. 13, the base station 1304 may receive, at 1322, the CLI report from the UE 1302. The reception of the CLI report may be performed, e.g., by the CLI report component 1946 via the reception component 1930 of the apparatus 1902 in FIG. 19.

At 1712, the base station may receive, from a plurality of UEs in the group of UEs, a plurality of signals that include at least one of a RSSI, a RSRP, or a RSRQ, the plurality of signals associated with at least one of a CLI measurement or a self-interference measurement. The reception may be performed, e.g. by the reception component 1930 of the apparatus in FIG. 19. For example, referring to FIG. 13, the base station 1304 may receive, at 1322, at least one of RSSI, RSRP, or RSRQ. The RSSI, RSRP, and/or RSRQ may be associated with the CLI measurement 1320 and/or a self-interference measurement performed based on the SRS transmission at 1314.

Figure 18:
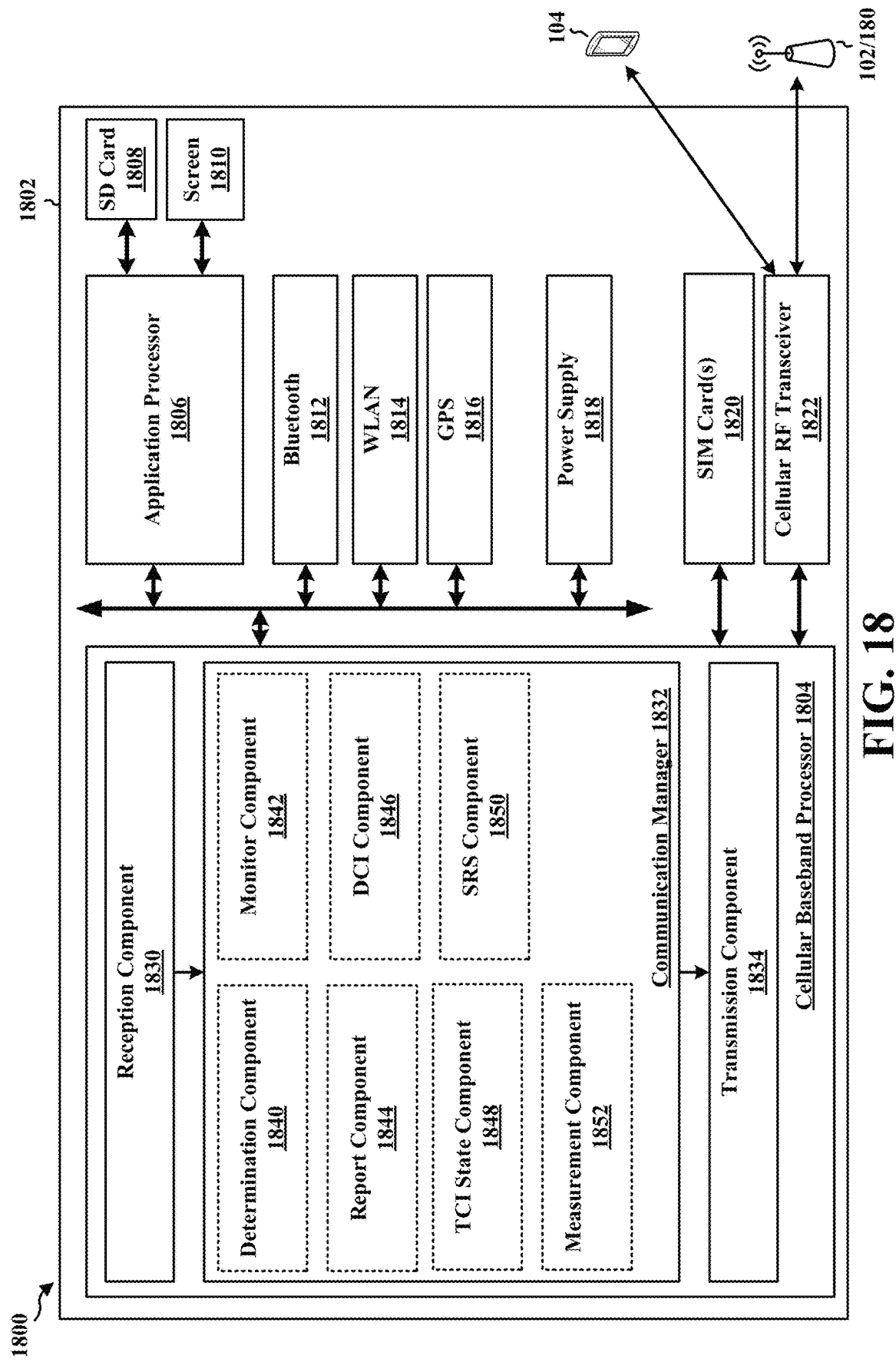
FIG. 18 is a diagram illustrating an example of a hardware implantation for an example apparatus.

FIG. 18 is a diagram 1800 illustrating an example of a hardware implementation for an apparatus 1802. The apparatus 1802 is a UE and includes a cellular baseband processor 1804 (also referred to as a modem) coupled to a cellular RF transceiver 1822 and one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, and a power supply 1818. The cellular baseband processor 1804 communicates through the cellular RF transceiver 1822 with the UE 104 and/or base station 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the aforediscussed additional modules of the apparatus 1802.

The reception component 1830 is configured, e.g., as described in connection with 1602, 1606, and 1610, to receive DCI that is common to a group of UEs that includes the UE, the DCI configured to trigger at least one of an SRS transmission or a CLI measurement; receive a TCI state indicative of QCL Type D for CSI-IM resources, where the UE performs the CLI measurement in the CSI-IM resources; and receive a plurality of SRS transmissions from a subset of UEs in the group of UEs, the plurality of SRS transmissions received based on different SRS resource. The communication manager 1832 includes a determination component 1840 that is configured, e.g., as described in connection with 1608, to determine, based on a payload of the DCI that is common to the group of UEs, whether to perform at least one of the SRS transmission or the CLI measurement. The communication manager 1832 further includes a monitor component 1842 that is configured, e.g., as described in connection with 1604, to monitor a block included in multiple blocks of a payload of the DCI based on a DCI position index. The communication manager 1832 further includes a report component 1844 that is configured, e.g., as described in connection with 1612 and 1614, to report, to a base station, at least one of a RSSI, a RSRP, or a RSRQ associated with the different SRS resources; and report the CLI measurement based on the DCI that is common to the group of UEs. The transmission component 1834 is configured, e.g., as described in connection with 1614, to transmit the SRS transmission based on the DCI that is common to the group of UEs.

The apparatus may include additional components that perform each of the blocks of the algorithm in the aforementioned flowchart of FIG. 16. As such, each block in the aforementioned flowcharts of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the cellular baseband processor 1804, includes means for receiving, determining, monitoring, reporting, and transmitting. The aforementioned means may be one or more of the aforementioned components of the apparatus 1802 configured to perform the functions recited by the aforementioned means. As described supra, the apparatus 1802 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 19:
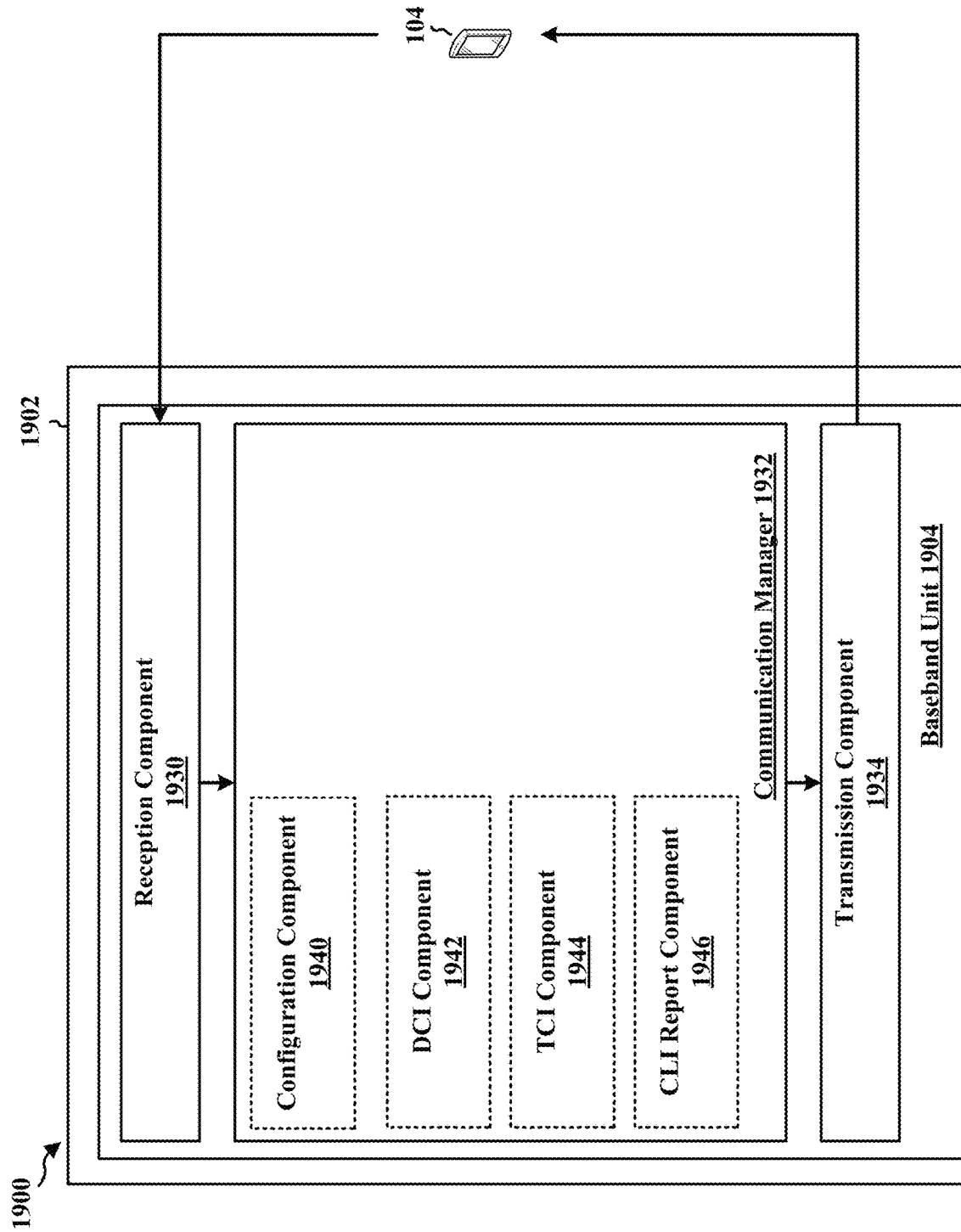
FIG. 19 is a diagram illustrating an example of a hardware implementation for an example apparatus.

FIG. 19 is a diagram 1900 illustrating an example of a hardware implementation for an apparatus 1902. The apparatus 1902 is a base station and includes a baseband unit 1904. The baseband unit 1904 may communicate through a cellular RF transceiver with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the base station 310 and may include the memory 376 and/or at least one of the TX processor 316, the RX processor 370, and the controller/processor 375.

The reception component 1930 is configured, e.g., as described in connection with 1710 and 1712, to receive, from a plurality of UEs in the group of UEs, a plurality of signals that include at least one of a RSSI, a RSRP, or a RSRQ, the plurality of signals associated with at least one of a CLI measurement or a self-interference measurement. The apparatus 1902 may include a CLI report component 1946 configured to receive the CLI report from at least a subset of UEs in the group of UEs via the reception component 1930. The communication manager 1932 includes a configuration component 1940 that is configured, e.g., as described in connection with 1702, to configure each UE in a group of UEs to monitor a position in a DCI payload of a DCI that is common to the group of UEs. The apparatus 1902 may include a DCI component 1942 that is configured, e.g., as described in connection with 1704 and/or 1706, to transmit at least one DCI that is common to the group of UEs to trigger at least one of an SRS transmission or a CLI report for the group of UEs; at least one of an SRS triggering codepoint, a TPC command, or a CLI request in a block of the DCI payload via the transmission component 1934. The apparatus may include a TCI component 1944 configured to transmit a TCI state indicative of QCL Type D for CSI-IM resources via the transmission component 1934.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for receiving, configuring, and transmitting. The aforementioned means may be one or more of the aforementioned components of the apparatus 1902 configured to perform the functions recited by the aforementioned means. As described supra, the apparatus 1902 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of CLI measurement and reporting at a UE, including: receiving DCI that is common to a group of UEs that includes the UE, the DCI configured to trigger at least one of an SRS transmission or a CLI measurement; and transmitting the SRS transmission or reporting the CLI measurement based on the DCI that is common to the group of UEs.

Aspect 2 may be combined with aspect 1 and further includes determining, based on a payload of the DCI that is common to the group of UEs, whether to perform at least one of the SRS transmission or the CLI measurement.

Aspect 3 may be combined with aspect 2 and further includes determining whether to perform at least one of the SRS transmission or the CLI measurement and determining that the UE is a full-duplex UE configured to both transmit the SRS transmission and perform the CLI measurement at a same symbol of a slot.

Aspect 4 may be combined with aspect 2 and further includes determining whether to perform at least one of the SRS transmission or the CLI measurement and determining that the UE is a full-duplex UE configured to both transmit the SRS transmission and perform the CLI measurement at different symbols of a slot.

Aspect 5 may be combined with any of aspects 1-4 and further includes receiving a TCI state indicative of QCL Type D for CSI-IM resources, wherein the UE performs the CLI measurement in the CSI-IM resources.

Aspect 6 may be combined with any of aspects 1-5 and further includes that the SRS transmission is aperiodic.

Aspect 7 may be combined with any of aspects 1-5 and further includes that the SRS transmission is semi-persistent.

Aspect 8 may be combined with any of aspects 1-7 and further includes receiving a plurality of SRS transmissions from a subset of UEs in the group of UEs, the plurality of SRS transmissions received based on different SRS resources; and reporting, to a base station, at least one of a RSSI, a RSRP, or a RSRQ associated with the different SRS resources.

Aspect 9 may be combined with any of aspects 1-8 and further includes that a configuration for reporting the CLI measurement to a base station is based on a scheduling of the SRS transmission.

Aspect 10 may be combined with any of aspects 1-9 and further includes that the CLI measurement is reported to a base station based on at least one of a CLI-RSSI, an SRS-RSRP, or an SRS-RSRQ.

Aspect 11 may be combined with any of aspects 1-10 and further includes that the DCI that is common to the group of UEs includes a payload having multiple blocks, the multiple blocks associated with a DCI position index based on an RRC configuration.

Aspect 12 may be combined with aspect 11 and further includes monitoring a block included in the multiple blocks based on the DCI position index.

Aspect 13 may be combined with aspect 11 or 12 and further includes that the multiple blocks include a first block and a second block, the first block configured to trigger the SRS transmission, the second block configured to trigger the reporting of the CLI measurement.

Aspect 14 may be combined with any of aspects 11-13 and further includes that the UE is configured with one or more DCI positions based on the DCI position index, the one or more DCI positions corresponding to a respective block in the multiple blocks of the payload.

Aspect 15 is a method of configuring CLI measurement and reporting at a base station, including: transmitting at least one DCI that is common to a group of UEs to trigger at least one of an SRS transmission or a CLI report for the group of UEs; and receiving the CLI report from at least a subset of UEs in the group of UEs.

Aspect 16 may be combined with aspect 15 and further includes that the base station transmits a first DCI that is common to a first set of UEs to trigger the SRS transmission from the first set of UEs, and wherein the base station transmits a second DCI that is common to a second set of UEs to trigger the CLI report from the second set of UEs.

Aspect 17 may be combined with aspect 15 and further includes that the base station transmits a single DCI that triggers both the SRS transmission and the CLI report.

Aspect 18 may be combined with any of aspects 15-17 and further includes configuring each UE in the group of UEs to monitor a position in a DCI payload of the DCI that is common to the group of UEs.

Aspect 19 may be combined with aspect 18 and further includes transmitting at least one of an SRS triggering codepoint, a TPC command, or a CLI request in a block of the DCI payload.

Aspect 20 may be combined with aspect 18 or 19 and further includes that the DCI payload includes a first block and a second block, the first block configured to trigger the SRS transmission, the second block configured to trigger the CLI report for the group of UEs.

Aspect 21 may be combined with any of aspects 18-20 and further includes that each UE in the group of UEs is configured with one or more DCI positions in the DCI payload that correspond to at least one of transmitting the SRS transmission or receiving the CLI report.

Aspect 22 may be combined with any of aspects 15-21 and further includes receiving, from a plurality of UEs in the group of UEs, a plurality of signals that include at least one of a RSSI, a RSRP, or a RSRQ, the plurality of signals associated with at least one of a CLI measurement or a self-interference measurement.

Aspect 23 may be combined with any of aspects 15-22 and further includes transmitting a TCI state indicative of QCL Type D for CSI-IM resources.

Aspect 24 is an apparatus for wireless communication including at least one processor coupled to a memory and configured to implement a method as in any of aspects 1-14.

Aspect 25 is an apparatus for wireless communication including means for implementing a method as in any of aspects 1-14.

Aspect 26 is a non-transitory computer-readable medium storing computer executable code, where the code when executed by a processor causes the processor to implement a method as in any of aspects 1-14.

Aspect 27 is an apparatus for wireless communication including at least one processor coupled to a memory and configured to implement a method as in any of aspects 15-23.

Aspect 28 is an apparatus for wireless communication including means for implementing a method as in any of aspects 15-23.

Aspect 29 is a non-transitory computer-readable medium storing computer executable code, where the code when executed by a processor causes the processor to implement a method as in any of aspects 15-23.

What is claimed is:

1. A user equipment (UE), comprising:
at least one memory; and
at least one processor coupled to the at least one memory, wherein the UE is configured to:
receive downlink control information (DCI) that is common to a group of UEs that includes the UE, wherein a payload of the DCI is configured to trigger at least one of: transmission of a sounding reference signal (SRS) or a cross link interference (CLI) measurement report; and
transmit, based on the payload of the DCI, the SRS and the CLI measurement report at a same symbol of a slot.

2. The UE of claim 1, wherein the SRS is aperiodic.

3. The UE of claim 1, wherein the SRS is semi-persistent.

4. The UE of claim 1, wherein the UE is configured to:
receive a plurality of SRS transmissions corresponding to different SRS resources from a subset of UEs in the group of UEs, wherein the CLI measurement report includes at least one of: a received signal strength indicator (RSSI) associated with the different SRS resources, a reference signal received power (RSRP) associated with the different SRS resources, or a reference signal received quality (RSRQ) associated with the different SRS resources.

5. The UE of claim 1, wherein a configuration for the CLI measurement report is based on a scheduling of the SRS.

6. The UE of claim 1, wherein the UE further includes a transceiver coupled to the at least one processor, wherein, to receive the DCI, the UE is configured to receive the DCI via the transceiver, and wherein, to transmit the SRS and the CLI measurement report, the UE is configured to transmit the SRS and the CLI measurement report via the transceiver.

7. A user equipment (UE), comprising:
at least one memory; and
at least one processor coupled to the at least one memory, wherein the UE is configured to:
receive downlink control information (DCI) that is common to a group of UEs that includes the UE, wherein a payload of the DCI is configured to trigger at least one of: transmission of a sounding reference signal (SRS) or a cross link interference (CLI) measurement report; and
transmit, based on the payload of the DCI, the SRS and the CLI measurement report at different symbols of a slot.

8. A user equipment (UE), comprising:
at least one memory; and
at least one processor coupled to the at least one memory, wherein the UE is configured to:
receive downlink control information (DCI) that is common to a group of UEs that includes the UE, wherein a payload of the DCI is configured to trigger at least one of: transmission of a sounding reference signal (SRS) or a cross link interference (CLI) measurement report;
transmit, based on the payload of the DCI, the SRS or the CLI measurement report;
receive a transmission configuration indicator (TCI) state indicative of quasi co-location (QCL) Type D for channel state information-interference measurement (CSI-IM) resources; and
obtain a CLI measurement based on the CSI-IM resources.

9. The UE of claim 8, wherein the UE is configured to obtain the CLI measurement based on the payload of the DCI.

10. The UE of claim 8, wherein, to transmit the SRS or the CLI measurement, the UE is configured to transmit the CLI measurement report, and wherein the CLI measurement report includes the CLI measurement.

11. A user equipment (UE), comprising:
at least one memory; and
at least one processor coupled to the at least one memory, wherein the UE is configured to:
receive a radio resource control (RRC) configuration;
receive downlink control information (DCI) that is common to a group of UEs that includes the UE, wherein a payload of the DCI is configured to trigger at least one of: transmission of a sounding reference signal (SRS) or a cross link interference (CLI) measurement report, wherein the payload of the DCI includes multiple blocks, and wherein the multiple blocks are associated with a DCI position index based on the RRC configuration; and
transmit, based on the payload of the DCI, the SRS or the CLI measurement report.

12. The UE of claim 11, wherein the RRC configuration indicates for the UE to monitor a block included in the multiple blocks based on the DCI position index.

13. The UE of claim 11, wherein the multiple blocks include a first block and a second block, and wherein the first block is configured to trigger transmission of the SRS, and the second block is configured to trigger transmission of the CLI measurement report.

14. The UE of claim 11, wherein the UE is configured with one or more DCI positions based on the DCI position index, the one or more DCI positions corresponding to a respective block in the multiple blocks of the payload.

15. The UE of claim 11, wherein the multiple blocks include a first block and a second block, and wherein, to transmit the SRS or the CLI measurement report, the UE is configured to:
   transmit, based on the first block, the SRS; and
   transmit, based on the second block, the CLI measurement report.

16. A method of wireless communication performed by a user equipment (UE), comprising:
   receiving downlink control information (DCI) that is common to a group of UEs that includes the UE, wherein a payload of the DCI is configured to trigger at least one of: transmission of a sounding reference signal (SRS) or a cross link interference (CLI) measurement report; and
   transmitting, based on the payload of the DCI, the SRS and the CLI measurement report at a same symbol of a slot.

17. The method of claim 16, wherein the SRS is aperiodic.

18. The method of claim 16, wherein the SRS is semi-persistent.

19. The method of claim 16, further comprising:
   receiving a plurality of SRS transmissions corresponding to different SRS resources from a subset of UEs in the group of UEs, wherein the CLI measurement report includes at least one of: a received signal strength indicator (RSSI) associated with the different SRS resources, a reference signal received power (RSRP) associated with the different SRS resources, or a reference signal received quality (RSRQ) associated with the different SRS resources.

20. The method of claim 16, wherein a configuration for the CLI measurement report is based on a scheduling of the SRS.

21. A method of wireless communication performed by a user equipment (UE), comprising:
   receiving downlink control information (DCI) that is common to a group of UEs that includes the UE, wherein a payload of the DCI is configured to trigger at least one of: transmission of a sounding reference signal (SRS) or a cross link interference (CLI) measurement report; and
   transmitting, based on the payload of the DCI, the SRS and the CLI measurement report at different symbols of a slot.

22. A method of wireless communication performed by a user equipment (UE), comprising:
   receiving downlink control information (DCI) that is common to a group of UEs that includes the UE, wherein a payload of the DCI is configured to trigger at least one of: transmission of a sounding reference signal (SRS) or a cross link interference (CLI) measurement report; and
   transmitting, based on the payload of the DCI, the SRS or the CLI measurement report;
   receiving a transmission configuration indicator (TCI) state indicative of quasi co-location (QCL) Type D for channel state information-interference measurement (CSI-IM) resources; and
   obtaining a CLI measurement based on the CSI-IM resources.

23. The method of claim 22, wherein the UE obtains the CLI measurement based on the payload of the DCI.

24. The method of claim 22, wherein the UE transmits the CLI measurement report, and wherein the CLI measurement report includes the CLI measurement.

25. A method of wireless communication performed by a user equipment (UE), comprising:
   receiving a radio resource control (RRC) configuration;
   receiving downlink control information (DCI) that is common to a group of UEs that includes the UE, wherein a payload of the DCI is configured to trigger at least one of: transmission of a sounding reference signal (SRS) or a cross link interference (CLI) measurement report, wherein the payload of the DCI includes multiple blocks, and wherein the multiple blocks are associated with a DCI position index based on the RRC configuration; and
   transmitting, based on the payload of the DCI, the SRS or the CLI measurement report.

26. The method of claim 25, wherein the RRC configuration indicates for the UE to monitor a block included in the multiple blocks based on the DCI position index.

27. The method of claim 25, wherein the multiple blocks include a first block and a second block, wherein the first block is configured to trigger transmission of the SRS, and the second block is configured to trigger transmission of the CLI measurement report.

28. The method of claim 25, wherein the UE is configured with one or more DCI positions based on the DCI position index, the one or more DCI positions corresponding to a respective block in the multiple blocks of the payload.

29. The method of claim 25, wherein the multiple blocks include a first block and a second block, and wherein transmitting the SRS or the CLI measurement report comprises:
   transmitting, based on the first block, the SRS; and
   transmitting, based on the second block, the CLI measurement report.

* * * * *